United States Patent
Ramani et al.

(10) Patent No.: US 7,326,397 B2
(45) Date of Patent: *Feb. 5, 2008

(54) CATALYTIC PARTIAL OXIDATION PROCESS FOR RECOVERING SULFUR FROM AN $H_2S$-CONTAINING GAS STREAM

(75) Inventors: Sriram Ramani, Ponca City, OK (US); Alfred E. Keller, Ponca City, OK (US); Devadas Panjala, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/225,355

(22) Filed: Sep. 13, 2005

(65) Prior Publication Data

US 2006/0051275 A1    Mar. 9, 2006

Related U.S. Application Data

(63) Continuation-in-part of application No. 10/024,679, filed on Dec. 18, 2001, now Pat. No. 6,949,111.

(60) Provisional application No. 60/256,440, filed on Dec. 18, 2000.

(51) Int. Cl.
*C01B 17/04* (2006.01)
(52) U.S. Cl. .................. 423/576.2; 422/169; 422/177; 423/576.8
(58) Field of Classification Search ............. 423/576.2, 423/576.8
See application file for complete search history.

(56) References Cited

U.S. PATENT DOCUMENTS

| | | | |
|---|---|---|---|
| 1,930,716 A | 10/1933 | Jaegar | |
| 2,963,348 A | 12/1960 | Sellers | |
| 3,752,877 A | 8/1973 | Beavon | |
| 4,038,036 A | 7/1977 | Beavon | |
| 4,146,580 A | 3/1979 | Beavon | |
| 4,197,277 A | 4/1980 | Sugier et al. | |
| 4,219,445 A | 8/1980 | Finch | |
| 4,233,276 A | 11/1980 | D'Souza et al. | |

(Continued)

FOREIGN PATENT DOCUMENTS

| EP | 0 303 438 | 8/1988 |
|---|---|---|
| FR | 2702675 | 3/1993 |
| RU | 2023655 | 11/1994 |
| WO | WO 97/19019 | 5/1997 |
| WO | WO 01/81241 | 11/2001 |

OTHER PUBLICATIONS

Chao, J , *Properties of Elemental Sulfur, Hydrocarbon Processing*, 217-223, (1980), no month.

(Continued)

*Primary Examiner*—Wayne A. Langel
(74) *Attorney, Agent, or Firm*—Conley Rose P.C.

(57) ABSTRACT

A process for purifying a light hydrocarbon stream containing $H_2S$ is disclosed in which the selective catalytic partial oxidation of the $H_2S$ component is carried out while the hydrocarbon components slip through substantially unconverted. A catalyst that favors the partial oxidation of $H_2S$ over conversion of the hydrocarbon component of a gaseous $H_2S$-light hydrocarbon mixture is employed. Apparatus for selectively cleaning up light hydrocarbon streams containing low concentrations (e.g., less than 25 vol. %), and apparatus for selectively cleaning up light hydrocarbon streams having higher concentrations (e.g., greater than 25 vol. %) of $H_2S$ are also disclosed.

30 Claims, 6 Drawing Sheets

U.S. PATENT DOCUMENTS

| | | | |
|---|---|---|---|
| 4,271,041 A | 6/1981 | Boudart | |
| 4,279,882 A | 7/1981 | Beavon | |
| 4,302,434 A | 11/1981 | Hellmer et al. | |
| 4,311,683 A | 1/1982 | Hass et al. | |
| 4,314,983 A * | 2/1982 | Hass et al. | 423/542 |
| 4,325,842 A | 4/1982 | Slaugh | |
| 4,325,843 A | 4/1982 | Slaugh | |
| 4,326,992 A | 4/1982 | Slaugh | |
| 4,331,544 A | 5/1982 | Takaya | |
| 4,406,873 A | 9/1983 | Beavon | |
| 4,481,181 A | 11/1984 | Norman | |
| 4,632,043 A | 12/1986 | Pendergraft | |
| 4,684,514 A | 8/1987 | Chen | |
| 4,722,799 A | 2/1988 | Ashbrook et al. | |
| 4,797,268 A | 1/1989 | McGovern et al. | |
| 4,814,159 A | 3/1989 | Voirin | |
| 4,844,837 A | 7/1989 | Heck et al. | |
| 4,863,707 A | 9/1989 | McShea, III et al. | |
| 4,877,550 A | 10/1989 | Goetsch et al. | |
| 4,886,649 A | 12/1989 | Ismagilov et al. | |
| 4,889,701 A | 12/1989 | Jones et al. | |
| 4,891,187 A | 1/1990 | Jungfer et al. | |
| 4,988,494 A | 1/1991 | Lagas et al. | |
| 5,039,503 A | 8/1991 | Sauvion et al. | |
| 5,185,140 A | 2/1993 | Kvasnikoff et al. | |
| 5,232,467 A | 8/1993 | Child et al. | |
| 5,338,716 A | 8/1994 | Triplett | |
| 5,397,556 A | 3/1995 | Towler et al. | |
| 5,451,557 A | 9/1995 | Sherif | |
| 5,458,808 A | 10/1995 | Suggitt et al. | |
| 5,472,920 A | 12/1995 | Dubois et al. | |
| 5,508,013 A | 4/1996 | Kvasnikoff et al. | |
| 5,512,260 A | 4/1996 | Kiliany et al. | |
| 5,573,991 A | 11/1996 | Sherif | |
| 5,597,546 A | 1/1997 | Li et al. | |
| 5,603,913 A | 2/1997 | Alkhazov | |
| 5,628,977 A | 5/1997 | Heisel et al. | |
| 5,639,929 A | 6/1997 | Bharadwaj et al. | |
| 5,648,582 A | 7/1997 | Schmidt | |
| 5,653,953 A | 8/1997 | Li et al. | |
| 5,654,491 A | 8/1997 | Goetsch | |
| 5,676,921 A | 10/1997 | Heisel et al. | |
| 5,700,440 A | 12/1997 | Li | |
| 5,720,901 A | 2/1998 | De Jong et al. | |
| 5,807,410 A | 9/1998 | Borsboom | |
| 5,814,293 A | 9/1998 | Terorde et al. | |
| 5,891,415 A | 4/1999 | Alkhazov et al. | |
| 5,897,850 A | 4/1999 | Borsboom | |
| 5,965,100 A | 10/1999 | Khanmamedov | |
| 5,985,178 A | 11/1999 | Long et al. | |
| 6,017,507 A | 1/2000 | Nougayrede et al. | |
| 6,083,471 A | 7/2000 | Philippe et al. | |
| 6,099,819 A | 8/2000 | Srinivas et al. | |
| 6,103,206 A | 8/2000 | Taylor, Jr. et al. | |
| 6,103,773 A | 8/2000 | Wittenbrink et al. | |
| 6,221,280 B1 | 4/2001 | Anumakonda et al. | |
| 6,235,259 B1 | 5/2001 | Ledoux et al. | |
| 6,372,193 B1 | 4/2002 | Ledoux et al. | |
| 6,402,989 B1 | 6/2002 | Gaffney | |
| 6,403,051 B1 | 6/2002 | Keller | |
| 6,409,940 B1 | 6/2002 | Gaffney et al. | |
| 6,447,745 B1 | 9/2002 | Feeley et al. | |
| 6,488,838 B1 * | 12/2002 | Tonkovich et al. | 208/108 |
| 6,497,812 B1 | 12/2002 | Schinski | |
| 6,540,975 B2 | 4/2003 | Tonkovich et al. | |
| 6,579,510 B2 * | 6/2003 | Keller et al. | 423/573.1 |
| 6,616,909 B1 | 9/2003 | Tonkovich et al. | |
| 6,800,269 B2 | 10/2004 | Keller | |
| 6,946,111 B2 * | 9/2005 | Keller et al. | 423/576.2 |
| 7,138,101 B2 * | 11/2006 | Keller et al. | 423/573.1 |
| 2002/0119091 A1 * | 8/2002 | Keller | 423/576.8 |
| 2002/0131928 A1 * | 9/2002 | Keller et al. | 423/576.8 |
| 2003/0194366 A1 | 10/2003 | Srinivas et al. | |
| 2005/0100504 A1 * | 5/2005 | Geus et al. | 423/573.1 |

OTHER PUBLICATIONS

Chun, Sung Woo et al, *Selective oxidation of H2S to elemental sulfur over TiO₂/SiO₂ catalysis*, Applied Catalysis B: Environmental 16, 235-243 (1998), no month.

Claridge, et al, *New Catalysts for the Conversion of Methane to Synthesis Gas Molybdenum and tungsten Carbide*. J Catalysis 180, 85-100 (1998), no month.

Clark, P D., *Production of $H_2$ from catalytic partial oxidation of $H_2S$ in a short-contact-time reactor*, Cataysis Communications 5:743-747 (2004), no month.

Cybulski, A , and Moulijin, J. A , *Transformation of a Structured Carrier into Structured Catalyst*, Structured Catalysts and Reactors, Marcel Dekker, pp. 599-615, 1998, no month.

Gamson, B.W. et al , *Sulfur from Hydrogen Sulfide*, Chem Eng Prog vol. 49, No. 4, pp. 203-215, Apr. 1953.

Goar, B. Gene, *Today's Sulfur Recovery Processes*, Hydrocarbon Processing vol. 47, No. 9, 248-252 (1968), no month.

Goar, R. Gene, *First Recycle Selectox unit on stream*, Oil & Gas Journal, 124-125 (1982), no month.

Haaland, David M , *Noncatalytic Electrodes for Solid-Electrolyte Oxygen Sensors*, J Electrochem Soc : Electrochemical Science and Technology, vol. 127, No. 4, 796-804 (1980), no month.

Hass, R H. et al, *Process meets sulfur recovery needs*, Hydrocarbon Processing 104-107 (1981), no month.

Hickman, D A. et al , *Synthesis Gas Formation by Direct Oxidation of Methane over Pt Monoliths*, J. Catalysis 138, pp. 267-282 (1992), no month.

Hyne, J. B., *Methods for desulfurization of effluent gas streams*, The Oil & Gas Journal, 64-78 (Aug. 28, 1972).

Ismagilov, Z R. et al, *New Catalysts and Processes For Environment Protection*, React Kinet. Catal Lett , vol. 55, No. 2, 489-499 (1995), no month.

Kerr, Richard K et al, *A new sulfur-recovery process The RSRP*, Oil & Gas Journal 230-243 (1982), no month.

Kohl, Arthur L. and Riesenfeld, Fred C , *Gas Purification, Fourth Edition*, Gulf Publishing Company, Library of Congress Cataloging in Publication Data, TP7545K6, 1985, 665.7, 85-4148, ISBN 0-87201-314-6, pp. 457-460, no month.

Lagas, J A et al, *Selective-oxidation catalyst improves Claus process*, Oil & Gas Journal, 68-71 (1988), no month.

Li, Kuo-Tseng and Shyu, Ni-Shen, *Catalytic Oxidation of Hydrogen Sulfide to Sulfur on Vanadium Antimonate*. Ind Eng. Chem. Res. 1480-1484 (1997), no month.

Mellor, J W. , *A Comprehensive Treatise on Inorganic and Theoretical Chemistry*, vol. X, Longmans, Green and Co , New York, 118-119, 128-129, 206-213,221-223, 144-148,152-159,162-166,393-400 (1947), no month.

M. E D Raymont , *Role of hydrogen in Claus plants*, Hydrocarbon Processing, 177-179 (1975), no month.

M E D Raymont, *Make hydrogen from hydrogen sulfide*, Hydrocarbon Processing, 139-142 (1975), no month.

Taylor, H. Austin and Pickett, Charles F , *The Decomposition of Hydrogen Sulphide*, Journal of Physical Chemistry, vol. 31, pp. 1212-1219 (1927), no month.

S. C. Tsang et al , *Recent advances in the conversion of methane to synthesis gas*, Catalysis Today 23:3-15 (1995), no month.

Watson, R. W. et al., *The Successful Use of Oxygen in Claus Plants*, HTI Quarterly: Winter 1995/1996, pp. 95-101, no month.

PCT Search Report in PCT/US01/48795 dated Jun. 26, 2002 (4 pp.).

Hickman, D. A , et al "Production of Syngas by Direct Catalytic Oxidation of Methane," Science 259:343-346 (Jan. 15, 1993).

* cited by examiner

CATALYTIC PARTIAL OXIDATION PROCESS FOR RECOVERING SULFUR FROM AN H₂S-CONTAINING GAS STREAM

CROSS REFERENCE TO RELATED APPLICATIONS

This application is a continuation-in-part of U.S. patent application Ser. No. 10/024,679 filed Dec. 18, 2001, U.S. Pat. No. 6,946,111, which claims the benefit under 35 U.S.C. § 119(e) of U.S. Provisional Patent Application No. 60/256,440 filed Dec. 18, 2000. The disclosures of said applications are hereby incorporated herein by reference.

BACKGROUND OF THE INVENTION

1. Technical Field of the Invention

The present invention generally relates to the purification of light hydrocarbon gas streams by removal of hydrogen sulfide ($H_2S$) contaminant. More particularly the invention relates to methods that employ the catalytic partial oxidation of $H_2S$ to form elemental sulfur and water, and to catalyst compositions that are active for catalyzing such conversion. Still more particularly, the invention pertains to such catalysts and methods which favor the partial oxidation of the $H_2S$ component over partial oxidation of the hydrocarbon component of a $H_2S$-containing light hydrocarbon gas stream.

2. Description of the Related Art

Hydrocarbon gases that occur as natural formations in the ground ("natural gas") typically contain a mixture of light alkanes, chiefly methane and some $C_2$-$C_4$ alkanes, and often include a significant amount of hydrogen sulfide ($H_2S$). Natural gas reserves containing more than 1% by volume (vol. %) $H_2S$ are common, and many naturally occurring formations have a much greater $H_2S$ content. Stranded natural gas reserves in the Middle East and in Canada, for example, typically have $H_2S$ concentrations in the range of 10-40 vol. %. The presence of $H_2S$ in natural gas is problematic. Not only does it have an intensely unpleasant odor, even when present at low concentrations, it is also toxic and often forms undesirable sulfur compounds as end products produced from the natural gas. Governmental regulations restrict the amount of $H_2S$ that can be introduced into the environment to only a few parts per million. Because it is more economical to transport some natural gas products in the form of a liquid rather than as a gas, most natural gas production operations include converting the natural gas to liquefied petroleum gas (LPG) at the well site. A drawback of working with the $H_2S$-contaminated LPG is that, in concentrated form, the $H_2S$ is extremely corrosive to the steel pipes and containers used to transport the $H_2S$-containing gases and liquids. As a result of those drawbacks, combined with the difficulty and expense of removing $H_2S$ from natural gas, the existing $H_2S$-containing natural gas formations have tended to be underutilized in the petroleum industry.

Today there is great interest in utilizing the world's plentiful natural gas resources, and much effort in the petroleum industry is now being directed toward selectively removing the $H_2S$ component prior to using the natural gas. While various methods exist for removing hydrogen sulfide from gases and liquids during natural gas processing, most of those processes require large, expensive sulfur removal and sulfur recovery plants, also referred to as Claus plants or modified Claus plants, for processing the sulfur.

The Claus process alone is not suitable for cleaning up light hydrocarbon streams that contain $H_2S$. Not only is the hydrocarbon content lost in the initial thermal combustion step of the Claus process, but carbon, carbonyl sulfide and carbon disulfide products cause catalyst fouling and dark sulfur. To avoid these problems, the usual way that $H_2S$ is removed from gaseous hydrocarbon streams generally involves an initial amine extraction process. In conventional industrial practice, a light hydrocarbon-containing gas stream that contains $H_2S$ is contacted with an alkanolamine solution. Alkanolamines commonly employed in the industry are monoethanolamine (MEA), diethanolamine (DEA), methyldiethanol amine (MDEA), diglycolamine (DGA), and diisopropanolamine (DIPA). These are basic nitrogen compounds. The basic alkanolamine reacts with the $H_2S$ and other gases that form acids when dissolved in water to form alkanolamine salts.

The hydrocarbon gas, substantially freed of $H_2S$, is recovered and may be used as fuel or routed to another system for processing. After absorbing the $H_2S$ from the gas, the alkanolamine solution is transported, heated, and placed in a stripping tower. Steam, generated from boiling the alkanolamine solution at the bottom of the stripping tower, lowers the vapor pressure of the acid gas above the solution reversing the equilibrium of the acid gas/alkanolamine reaction shown above. The acid gases leaving the stripper are cooled to condense most of the remaining steam. The acid gas stream then goes to a conventional sulfur recovery plant, also referred to as a Claus plant or modified Claus plant. In the Claus plant, the $H_2S$ gas from the alkanolamine stripper is contacted with air or a mixture of oxygen and air in a flame. One third (⅓) of the $H_2S$ is burned according to the reaction:

$$H_2S + 3/2 O_2 \rightarrow SO_2 + H_2O \qquad (I)$$

The remaining ⅔ of the $H_2S$ is converted to sulfur via the Claus reaction:

$$2H_2S + SO_2 \leftrightarrow 3/x S_x + 2H_2O \qquad (II)$$

(x=2, 6, or 8 depending on temperature and pressure)

The gases are cooled in a fire tube boiler after the burner. Nominally, this step converts 55 to 70% of the $H_2S$ to elemental sulfur. The equilibrium of the Claus reaction of (Reaction II) limits the conversion. To improve the yield, elemental sulfur is condensed from the gas stream. After sulfur condensation and separation from the liquid sulfur, the unreacted gases are heated to the desired temperature, passed over a catalyst that promotes the Claus reaction, and cooled again to condense and separate the sulfur. Typically, 2 to 3 stages of Claus reheater, reactor, and condenser stages are employed. Anywhere from 90 to 98% of the $H_2S$ fed to the unit is recovered as elemental sulfur. A Claus process is efficient for processing large quantities of gases containing a high concentration of $H_2S$ (i.e., >20% by volume) in plants producing more than 7000 metric tons of sulfur per year.

In the effluent from Claus plants, any remaining $H_2S$, $SO_2$, other sulfur compounds and elemental sulfur are either incinerated to $SO_2$ and discharged to the atmosphere or absorbed by chemical reaction, or converted by hydrogen to $H_2S$ and recycled or absorbed by an alkanolamine solution. This is accomplished by various "tail gas" treatment units, which improve the efficiency of sulfur removal from the gas discharged to the atmosphere. For example, R. H. Hass et al. (*Hydrocarbon Processing* May 1981:104-107) describe the BSR/Selectox™ process for conversion of residual sulfur in Claus tail gas or for pre-Claus treatment of a gas stream. K-T Li at al. (*Ind. Eng. Chem. Res.* 36:1480-1484 (1997)) describe the SuperClaus™ TGT system which uses vanadium antimonate catalysts to catalyze the selective oxidation of hydrogen sulfide to elemental sulfur.

Amine strippers and Claus plants in use today for purifying $H_2S$-contaminated light hydrocarbon streams are normally operated at less than 2 atmospheres pressure. Because of this low pressure operation, the pipes and vessels have very large diameters for the flow compared to most refinery or gas plant processes. The low pressure operation forces the equipment to be designed for low pressure drop in order to have adequate capacity. Since Claus-type processes cannot provide a high level of $H_2S$ conversion and selectivity for elemental sulfur product without the use of multiple Claus reactor stages, when treating high $H_2S$ concentration streams, a typical modified Claus plant, also includes one or more tail gas treatment units. Therefore, the desulfurization plant can be quite large and may include a great deal of equipment.

In addition to the Claus tail gas treatments which employ the direct oxidation of $H_2S$ to elemental sulfur, other techniques have been described in the literature for selectively oxidizing $H_2S$ employing aqueous redox chemistry utilizing chelated iron salts or nitrite salts in an attempt to purifying hydrogen sulfide contaminated hydrogen or gaseous light hydrocarbon resources. According to such techniques, the $H_2S$-contaminated hydrogen or hydrocarbon stream is typically contacted directly with the redox reagent such as chelated iron (III) ions. The iron (III) is reduced to iron (II) ion while the $H_2S$ is converted to elemental sulfur. The sulfur in solid form is separated from the solution. Those types of redox units are generally considered to be practical when the amount of sulfur to be removed from the stream is below 5 long tons per day.

U.S. Pat. No. 4,311,683 (Hass et al.) describes a process for the removal of $H_2S$ from a feed gas, and the production of sulfur therefrom, by oxidation with oxygen and/or $SO_2$ at temperatures between 250° and 450° F., using a stable oxidation catalyst comprising an oxide and/or sulfide of vanadium on a non-alkaline porous refractory oxide. The partial pressure of free sulfur in the oxidation reactor is kept below that necessary for condensation. It is said that $H_2$, CO and light hydrocarbons present in the feed gas are not oxidized.

U.S. Pat. No. 5,603,913 describes several oxide catalysts that have been suggested for catalyzing the direct partial oxidation of $H_2S$ to elemental sulfur and water. Because the direct partial oxidation is not a thermodynamically reversible reaction, such methods offer potentially higher levels of conversion than is practically obtainable with only thermal and Claus oxidation of $H_2S$. Most direct oxidation methods are applicable to sour gas streams containing relatively small amounts of $H_2S$ and large amounts of hydrocarbons, but are not particularly well suited for handling the more concentrated acid gas streams from refineries and from many natural gas formations. For this reason direct oxidation methods have been generally limited to use as tail gas treatments only, and have not found general industrial applicability for first stage sulfur removal systems from gases containing large quantities of $H_2S$.

The restriction to low $H_2S$ concentration gases is due, in part, to the increase in adiabatic heating of the catalyst bed that occurs at higher concentrations of $H_2S$, i.e., above about 3 vol. %.

The limit of heat tolerance of the reaction vessel, which is typically made of steel, can be quickly reached when a high concentration of $H_2S$ is reacted. Also, the higher temperatures (above about 350° C.) cause an increase in the rate of reaction of $SO_2$ formation. Additionally, the $H_2S$ concentration range is usually kept low because of the necessity for supplying excess $O_2$ to overcome deactivation of most direct oxidation catalysts caused by water. As a practical matter, the need for a stoichiometric excess of $O_2$ precludes using $H_2S$ concentrations above about 2 vol. %. S. W. Chun et al. (*Applied Catalysis B: Environmental* 16:235-243 (1998)) describe a $TiO_2/SiO_2$ particulate catalyst that is not deactivated by the water formed in the partial oxidation reaction at a reactant gas ratio of 0.5-4 $O_2$:$H_2S$. In that report the $H_2S$ conversion is carried out with a fixed bed catalyst at a temperature of 275° C. and at a gas hourly space velocity (GHSV) of 3000 $hr^{-1}$.

P. D. Clark et al. (*Catalysis Communications* (2004) 5:743-747) describe the use of a short-contact-time partial oxidation reactor (SCTR) for production of $H_2$ from the catalytic partial oxidation of $H_2S$. That process utilizes a quartz tube reactor to produce hydrogen, sulfur and water as the predominant products at a set temperature of 400° C. and a contact time of 13 ms, wherein the conversion of $H_2S$ is 64.6%, $H_2$ selectivity is 20.8%, and the amount of $SO_2$ in the product is less than 0.5% of the input $H_2S$. Increased temperatures are reported to promote more $SO_2$ formation with the same $H_2S/O_2$ ratio in the feed. That process does not appear to contemplate treatment of a hydrocarbon-containing $H_2S$ gas stream.

U.S. Patent Application Publication No. 2003/194366 describes certain catalysts and process for oxidizing hydrogen sulfide to sulfur dioxide and sulfur. In general, a gas stream containing $H_2S$ and other oxidizable components is contacted with a mixed metal oxide oxidation catalyst at a temperature less than or equal to about 500° C. in the presence of a selected amount of oxygen to generate $SO_2$, sulfur or both wherein less than about 25 mol % by volume of the oxidizable components other than $H_2S$ and other sulfur-containing compounds are oxidized by the oxygen. It is said that, generally, the more active the metal oxide catalyst, the lower the reaction temperature that should be used, with the caveat that the reaction temperature should be maintained sufficiently above the sulfur dew point to avoid detrimental levels of sulfur condensation in the reactor. The more preferred temperature range for operation is said to be between about 160° C. to about 250° C., dependent upon the sulfur dew point.

The existing light hydrocarbon purification processes and systems typically require pre-treatment of the hydrocarbon-containing stream or post-treatment catalytic stages and absorbent treatments in order to preserve the useful hydrocarbon components of a gas stream. A practical and commercially attractive process for cleaning up $H_2S$-contaminated hydrocarbon streams, and at the same time recovering useful elemental sulfur, will find widespread application in a number of industrial situations. The petroleum industry would welcome a way to better utilize the world's abundant natural gas resources that are contaminated by $H_2S$.

SUMMARY OF THE INVENTION

The processes, apparatus and catalysts of the present invention overcome many of the drawbacks of the current technologies for rendering $H_2S$-contaminated light hydrocarbon gas streams more useful. The hydrocarbon components of a $H_2S$-contaminated light hydrocarbon stream are cleaned up by selectively oxidizing the $H_2S$ to sulfur with lesser, preferably minimal, oxidation of the hydrocarbons. The new processes and apparatus are suitable for use in upstream gas treatment such as treatment of a $H_2S$-containing natural gas feedstock for a synthesis gas generator, as well as downstream for refinery gas treatment, such as fluid catalytic cracker and coker fuel gases, hydrogen, and refinery fuel gas. Catalysts employed in such processes are typically deactivated by $H_2S$, and will therefore benefit from "clean" hydrocarbon feed devoid of $H_2S$. In addition, such "clean" hydrocarbon gases are generally sold at a premium for further processing and this invention can result in better economics when used. The present methods and apparatus offer a more practical way to utilize stranded gas reserves, and, advantageously, reduce or eliminate the usual dependence on conventional amine treating Claus-type processes. A new process as described herein is simpler, and less expensive compared to conventional hydrocarbon purification processes.

In accordance with certain embodiments of the present invention, a system for carrying out the selective catalytic partial oxidation of hydrogen sulfide in a hydrogen sulfide-containing light hydrocarbon feed gas stream is provided. The system preferably comprises (a) an assembly comprising, in sequential flow arrangement in the stated order, a short contact time reactor, a boiler and a sulfur condenser, the reactor comprising a feed gas inlet, an oxygen gas inlet, a mixer, a preheater, and a catalyst that is selective for catalyzing the partial oxidation of hydrogen sulfide to form elemental sulfur and water, and the condenser having a first process gas outlet and a liquid sulfur outlet; (b) a primary hydrocarbon feed gas line in fluid communication with the reactor feed gas inlet; (c) a water/sulfur vapor removal unit in fluid communication with the first process gas outlet, and having a second process gas outlet and a liquid water outlet; (d) an amine absorption unit having an inlet in fluid communication with the second process gas outlet and with the primary hydrocarbon feed gas line, and having a regenerated hydrogen sulfide gas outlet and a purified hydrocarbon gas outlet; and (e) a secondary hydrocarbon feed gas line in fluid communication with the primary hydrocarbon feed gas line and with the reactor feed gas inlet, and adapted for receiving hydrogen sulfide gas from the regenerated hydrogen sulfide gas outlet. In some embodiments, the primary hydrocarbon feed gas line may comprise a (first) valve. In some embodiments the system comprises a line for carrying the second process gas from the second process gas outlet to the amine absorption unit inlet. In some embodiments, the second process gas line includes a (second) valve, that may be used to regulate the flow of the second process gas out of the system and/or into the amine unit for removing residual $H_2S$.

In accordance with another embodiment of the present invention, a process of removing $H_2S$ from a light hydrocarbon feed gas stream containing at least one $C_1$-$C_5$ hydrocarbon component and an $H_2S$ component is provided.

The process preferably comprises (a) at a temperature above about 500° C., at about 2:1 to about 5:1 molar ratio of $H_2S$ to $O_2$, and in the presence of a $H_2S$-selective catalyst, partially oxidizing the $H_2S$ component in the hydrocarbon feed gas stream to form elemental sulfur and water without converting more than about 10 mole % of the carbon content of the light hydrocarbon component to CO or $CO_2$; and (b) recovering liquid sulfur and unreacted hydrocarbons. An $H_2S$-selective catalyst is more active for catalyzing the reaction $H_2S+\frac{1}{2}O_2 \rightarrow 1/x\ S_x+H_2O$ (x=2, 6, 8) than for cataliyzing the reaction $C_mH_{2m}+m/2\ O_2 \rightarrow m\ CO+n\ H_2$ (m=1-5; n=2-6).

In certain embodiments, the above described process of removing $H_2S$ from a hydrocarbon feed gas stream containing at least one $C_1$-$C_5$ hydrocarbon component and an $H_2S$ component includes (a) combining the light hydrocarbon feed gas stream and an $O_2$ containing stream to form a reactant gas mixture comprising the hydrocarbon, $H_2S$ and $O_2$; (b) preheating the mixture between 150° C. and 350° C.; c) at a reaction temperature in the range of about 700° C. to about 1,500° C., flowing a stream of the reactant gas mixture over the catalyst in a reaction zone such that the contact time of each portion of reactant gas mixture that contacts the catalyst is sufficiently brief to allow the reaction

$$H_2S+\tfrac{1}{2}O_2 \rightarrow 1/xS_x+H_2O \qquad (III)$$

(x=2, 6 or 8) to occur, whereby a reacted gas stream is formed comprising gaseous elemental sulfur, water, and unreacted $H_2S$ and light hydrocarbon; (d) passing the reacted gas stream into a first cooling zone and cooling the reacted gas stream to a temperature above the condensation point of elemental sulfur but below about 350° C., to yield a partially cooled reacted gas stream; (e) passing the partially cooled reacted gas stream into a second cooling zone and cooling the partially cooled gas to a temperature below the condensation point of elemental sulfur but above the freezing point of elemental sulfur, to yield liquid sulfur and a process gas stream containing unreacted $H_2S$ and light hydrocarbon, water vapor and residual sulfur vapor; (f) passing the process gas stream into a sulfur vapor cleanup unit, to convert sulfur vapor and any non-$H_2S$ sulfur compounds to $H_2S$; (g) passing the light hydrocarbon stream into a water condenser to provide a light hydrocarbon stream and liquid water; (h) passing the partially purified light hydrocarbon stream into an amine absorption/regeneration unit to yield a purified light hydrocarbon stream and a regenerated $H_2S$ stream; and (i) combining the regenerated $H_2S$ stream with the light hydrocarbon stream. In some embodiments, the light hydrocarbon feed gas stream comprises at least about 25 vol. % $H_2S$.

In certain other embodiments, the light hydrocarbon feed gas stream contains less than about 25 vol. % $H_2S$, and the process includes (i) splitting the light hydrocarbon feed gas stream into primary and secondary feed gas streams; (j) passing the primary feed gas stream into the amine absorption/regeneration unit to yield the purified light hydrocarbon stream and the regenerated $H_2S$ stream; (k) enriching the secondary feed gas stream with the regenerated $H_2S$ such that the resulting enriched feed gas stream comprises at least 25 vol. % $H_2S$; and (l) combining the enriched secondary feed gas stream and the $O_2$ containing stream to form the reactant gas mixture comprising the light hydrocarbon, $H_2S$ and $O_2$. In certain embodiments, step (h) includes combining the regenerated $H_2S$ stream with the secondary feed gas stream to provide the enriched feed gas stream.

In certain preferred embodiments of an above-described process, an approximately 3.3:1 molar ratio of $H_2S$ to $O_2$ is maintained in the reactant gas mixture. In some embodiments, the reactant gas mixture is preheated to a temperature in the range of about 150 to 350° C. prior to contacting the catalyst.

In some embodiments, the $O_2$-containing gas is chosen from the group consisting of purified $O_2$', air, and $O_2$ enriched air. In some embodiments, an above-described process includes keeping the temperature of the catalyst at about 700° C.-1,500° C. In some embodiments, the process includes initially heating the catalyst to at least about 700° C. while passing the reactant gas mixture over the catalyst until the $H_2S$ partial oxidation reaction is initiated. In some embodiments, the process includes maintaining reaction promoting conditions such that the $H_2S$ catalytic partial oxidation reaction continues autothermally, i.e., substantially no externally supplied heat must be provided to the catalyst in order to sustain the $H_2S$ partial oxidation reaction. Ensuring $H_2S$ partial oxidation reaction promoting conditions may include adjusting the relative amounts of $H_2S$, $O_2$ and other oxidizable components (e.g., hydrogen, hydrocarbons) in the reactant gas mixture. For example, preferably no more than a stoichiometric amount of $O_2$, relative to the $H_2S$ content of the feed mixture, sufficient to support the Reaction III is provided, in order to deter oxidation of the hydrocarbon components in the feed. $H_2S$ partial oxidation reaction promoting conditions may also include adjusting the amount of preheating of the reactant gas mixture and/or external heat applied to the catalyst, adjusting the operating pressure of the reactor, which is preferably maintained above atmospheric pressure, more preferably in excess of two atmospheres pressure. Increasing or decreasing the space velocity of the feed gas mixture, which varies according to the configuration of the catalyst bed, its porosity and the associated pressure drop, also can be used to favor Reaction III.

Advantageously, in certain embodiments of the new processes the need for large vessels operating at low pressures is eliminated because the process is carried out at superatmospheric pressures, preferably greater than 2 atmospheres. In the above-described processes, preferably care is taken to avoid exposing the catalyst to a sulfur-containing compound while the catalyst is at a temperature below about 300° C. In certain embodiments of any the above-described processes, the contact time of the reactant gas mixture with the catalytic surfaces of the catalyst is no more than about 200 milliseconds. In some embodiments, the contact time is less than 50 milliseconds, in other embodiments, less than 20 milliseconds, and in still other embodiments, the contact time is 10 milliseconds or less.

Preferably an above-described process is carried out in a system as described herein. In certain embodiments, an apparatus is provided for removing $H_2S$ from a light hydrocarbon stream containing less than 25 vol. % $H_2S$ and recovering elemental sulfur. The apparatus comprises (a) means for carrying out the selective partial oxidation of the $H_2S$ component of a first portion of $H_2S$-containing light hydrocarbon stream, and having a liquid sulfur outlet and a first process gas outlet; (b) means for removing water and converting a first portion of sulfur vapor or other non-$H_2S$ sulfur components from a first process gas stream, and having a liquid water outlet and a second process gas outlet; (c) extraction means for extracting and recovering $H_2S$ from a second portion of the $H_2S$-containing light hydrocarbon stream and for combining recovered $H_2S$ with the first portion of light hydrocarbon stream, and having an outlet for purified light hydrocarbons; and (d) means for combining at least a portion of the second process gas with the second portion of light hydrocarbon stream.

In accordance with certain embodiments, an apparatus is provided for removing $H_2S$ from light hydrocarbon streams containing greater than 25 vol. % $H_2S$, which comprises (a) means for carrying out the selective partial oxidation of the $H_2S$ component of a $H_2S$-containing light hydrocarbon stream, and having a liquid sulfur outlet and a first process gas outlet; (b) means for removing water and converting a first portion of sulfur vapor or other non-$H_2S$ sulfur components from a first process gas stream to $H_2S$, and having a liquid water outlet and a second process gas outlet; (c) extraction means for extracting and recovering $H_2S$ from the second process gas and for combining recovered $H_2S$ with the first portion of light hydrocarbon stream, and having an outlet for purified light hydrocarbons; (d) means for combining at least a portion of the recovered $H_2S$ with the $H_2S$-containing light hydrocarbon stream. In some embodiments, this apparatus may also include means for combining at least a portion of the purified light hydrocarbons with the $H_2S$-containing light hydrocarbon stream.

In still other embodiments of the present invention, a catalyst for an above-described apparatus and process that favors the partial oxidation of $H_2S$ over conversion of the hydrocarbon component of a mixed $H_2S$-light hydrocarbon stream is provided. The catalyst comprises Pt, Rh, Ir, Sn, and Mg supported on a refractory support. A preferred refractory support is chosen from the group consisting of alumina, zirconia and magnesium oxide, preferably magnesium oxide granules. In certain embodiments, the catalyst comprises a mixture of about 0.25-5% Pt, 0.25-5% Rh, 0.25-5% Ir, 0.25-5% Sn and 1-5% Mg (by weight of the supported catalyst). In some embodiments, the catalyst comprises at least one metal chosen from the group consisting of Pt, Rh, Ir, Ru, Pd, Mn, Sn, Sm, Ce and Mg, supported on a refractory support. The new processes are especially advantageous over existing direct oxidation methods in that they efficiently and selectively convert higher concentrations of $H_2S$ than is possible with the existing methods.

An advantage provided by certain embodiments of the present invention is that existing processes for removing $H_2S$ from an $H_2S$-containing gaseous stream that customarily employs a Claus sulfur recovery plant with a first stage furnace in which $H_2S$ is combusted and which also has at least one second stage partial oxidation unit in which $H_2S$ is directly oxidized to elemental sulfur and water, is that such plants can be improved by substituting millisecond contact time catalytic reactor for the combustion furnace or for one or more second stage partial oxidation units and by employing the $H_2S$ catalytic partial oxidation process as described herein. These and other aspects, embodiments, features and advantages of the present invention will become apparent with reference to the following drawings and description.

BRIEF DESCRIPTION OF THE DRAWINGS

For a more detailed description of the present invention, reference will now be made to the accompanying Figures, wherein.

DETAILED DESCRIPTION OF PREFERRED EMBODIMENTS

Definitions

Figure 1:
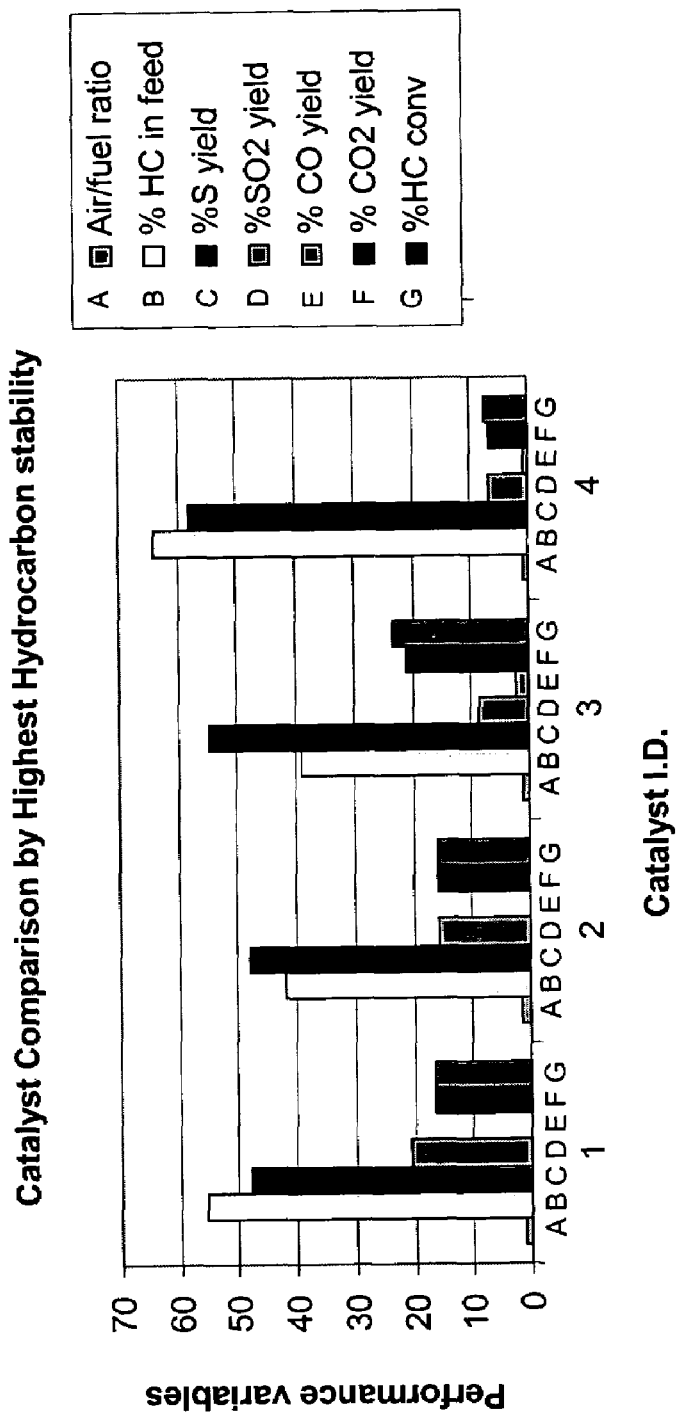
FIG. 1 is a bar graph comparing catalyst performance of four representative catalysts.

As used herein, the following terms have their usual meanings in the art and are intended to specifically include the following definitions:

A relatively "low" quantity or concentration of $H_2S$ refers to a concentration in the range of about 0.5 to 25 vol. % $H_2S$.

A relatively "high" quantity or concentration of $H_2S$ refers to a concentration in the range of about 25 to 50 vol. % $H_2S$.

The terms "selective" and "selectivity," when referring to the catalytic partial oxidation of $H_2S$ to form elemental sulfur and water, means that the catalyst is more active for converting the $H_2S$ component of a $H_2S$-containing light hydrocarbon stream to elemental sulfur and water under a given set of process conditions than it is active for converting the hydrocarbon component of the same gas stream to form carbon monoxide and hydrogen, given the same process conditions and the same $H_2S$-containing light hydrocarbon stream. Selectivity of a catalyst for a $H_2S$ reactant (over a light hydrocarbon reactant) does not preclude the catalyst's also having selectivity for forming one product over another. For example, under a given set of conditions, the formation of the elemental sulfur product may be favored by a given catalyst over formation of $SO_2$ product.

Similarly, a "selective catalytic partial oxidation process" refers to a catalyzed process that favors the partial oxidation of the $H_2S$ component of a $H_2S$-containing gaseous hydrocarbon feed to produce elemental sulfur and water, over the partial oxidation of the hydrocarbon component of the same feed to produce carbon monoxide and hydrogen, under the same process conditions.

As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within 110% of the stated numerical value.

The terms "discrete" or "divided" structures or units refer to catalyst devices or supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than ten millimeters, preferably less than five millimeters. The term "monolith" refers to any singular piece of material of continuous manufacture such as solid pieces of metal or metal oxide or foam materials or honeycomb structures.

"$C_mH_{2n}$" refers to one or more alkane in which m=1 to 5 and n=2-6. Methane is representative of the other $C_mH_{2n}$ alkanes, and use of the term "methane" in this disclosure is not intended to limit the disclosed methods to only the $C_1$ alkane.

The use of the terms "connecting," "connects to," "connected with," "coupled," "in fluid communication with," and like terms have their customary meaning in the art, and are intended to refer to either a direct or indirect fluid flow interconnection between a first device or apparatus and a second device or apparatus. Thus, for example, if a first apparatus is "connected to" a second apparatus, that interconnection may be through a direct joining of the two devices, or through an indirect interconnection via one or more intermediate or intervening device, fluid conductor or connector through which a gas or liquid can pass when flowing from the first device to the second.

Such connections may be fixed or separable. The term "fluid" is intended to refer to flowable substances, especially gases or liquids, and "fluid flow" refers to the movement of such substances.

Weight percent (wt. %) refers to the amount of metal component relative to the total weight of the catalyst, including the support, if any.

As used herein in the context of conversion of $H_2S$ primarily to elemental sulfur, the catalytic partial oxidation (CPOX) process is carried out in a short contact time reactor (SCTR). The terms "short contact time reactor" and "short contact time process" refer to the conversion of the reactant to products through the addition of oxygen gas in a reactor consisting of a selective solid-phase catalyst bed by limiting the contact time of the gases with the catalyst particles to control the reaction selectivity. Generally, the reactor must be capable of withstanding the high temperatures resulting from the exothermic oxidation reactions, ranging from the typical feed temperature of less than 300° C. up to 1,000° C. or even up to 1,500° C., marked by a sharp temperature rise at the catalyst-gas interface. Furthermore, to allow for a thermal barrier between the high temperature catalyst bed and the low temperature metal walls, the reactor is lined with inert refractory, capable of withstanding the high temperatures and the large cross-sectional thermal gradients. It is desirable to provide enough refractory thickness to bring the gas temperature to less than 300° C. at the refractory-metal wall interface. When $H_2S$ and/or hydrocarbons are present in the feed gases, the metallurgy of the reactor wall must be capable of withstanding the corrosion from possible formation of sulfur and/or carbon compounds. Common problems include corrosion from acidic sulfur compounds and metal dusting from carbon compounds. To selectively carry out the desired partial oxidation reaction, the catalyst bed and the reactor arrangement is designed to minimize the contact time between the feed gases and catalyst particles. This requires the capability of the reactor to operate at very high flow rates or gas hourly space velocities without causing physical damage to the catalyst bed and/or without snuffing the reaction. This also requires mechanically strong catalyst supports to hold the catalyst bed in place. The catalyst bed and reactor arrangement must be capable of operating with minimal pressure drop to allow for high throughput operation. This is generally achieved by designing the catalyst bed with high porosity, smooth, non-powder and attrition-resistant catalyst particles. The SCTR is designed such that the reaction components are able to flow freely with minimal resistance both upstream and downstream of the catalyst bed. The design of a short contact time reactor also minimizes dead spaces where pooling or stagnation of the reactant gases could occur and where undesirable gas-phase side reactions could occur. The design of a short contact time reactor also provides for rapid mixing of the reactant gases immediately before or at the time of contacting the catalyst.

Contact time is calculated as the inverse of gas hourly space velocity (GHSV), and GHSV is calculated as the ratio of combined feed gas volumetric flow rate to the catalyst bed volume.

Description

In co-owned U.S. Pat. No. 6,579,510, and U.S. patent application Ser. No. 10/317,936 (now U.S. Pat. No. 7,122,170), processes and catalysts were disclosed for directly converting $H_2S$ in a $H_2S$ and light hydrocarbon mixture to elemental sulfur, and converting the light hydrocarbon to synthesis gas, by way of concurrent catalytic partial oxidation reactions carried out in a single reaction zone over a catalyst that is active for promoting both partial oxidation reactions.

TABLE 1

Catalyst Details

| Catalyst I.D. | Catalyst Composition |
|---|---|
| 1 | 1% Ir—2% Ru/2% Mg on MgO granules |
| 2 | 1% Rh—2% Pt/2% Mg on MgO granules |
| 3 | 1% Rh—1% Pt/0.5% Ir/2% Mg on MgO granules |
| 4 | 1% Rh—1% Pt/1% Sn/0.5% Ir/2% Mg on MgO granules |

The catalysts were prepared by wet impregnation method. The following notation is used in the table to indicate the catalyst synthesis sequence: "1% A-2% B/3% C-4% D on MgO granules" refers to the mentioned wt. % of metals loaded on the MgO granules support by depositing C and D with intermediate drying (hence C-D), followed by calcination (/) and followed by depositing A and B with intermediate drying (A-B). Finally all catalysts were calcined and reduced to activate them for the reactions. The catalyst synthesis procedure is described in more detail in Example 1, and similar procedures are employed to prepare the other catalysts described herein.

EXAMPLE 1

Synthesis of an $H_2S$ Selective Catalyst

A preferred representative catalyst comprising Pt/Rh/Ir/Sn/Mg supported on MgO granules (Catalyst-4) was prepared as follows:

a. 20-30 mesh MagChem 10 MgO granules obtained from Martin Marietta Magnesia Specialties, MD were calcined at 1000° C. in air prior to loading catalyst metals on them.

b. On 10 gram batch of calcined MgO granules, 2 wt. % Mg was impregnated using magnesium nitrate precursor dissolved in distilled, de-ionized water. After drying with continuous stirring on hot plate at 70° C. to remove excess water, the material was calcined under air flow at 125° C. for 1 hour, 350° C. for 1 hour and 700° C. for 3 hours. This procedure resulted in coating MgO granules with a layer of MgO to form the base for subsequent metal loading and to increase the surface area.

c. Next, using the above procedure 0.5 wt. % Ir was loaded on the final material from step (b), using iridium chloride precursor. The final calcinations temperature was 500° C. in this step.

d. Using similar procedure as in step (c), 1 wt. % of Sn from stannous chloride, 1 wt. % Rh from rhodium chloride and 1 wt. % Pt from tetrammine platinum nitrate precursors were loaded in a stepwise manner.

e. This sequential impregnation procedure with intermediate drying and calcinations were found to result in more consistent catalyst formulations. But it was found through modified procedures that Rh and Pt can, alternatively, be loaded sequentially with drying and without calcinations in between to provide similar final product.

f. After the calcination following the addition of Pt precursor at similar conditions in (b), the catalyst was reduced in flowing gas mixture of nitrogen and hydrogen (in 1:1 volume ratio) at 125° C. for 1 hour, 350° C. for 1 hour and 500° C. for 3 hours, to reduce the catalyst metal oxides to a combination of metal and metal oxide forms, which are active for the desired oxidation reaction. The final composition of this catalyst was 1 wt. % Pt, 1 wt. % Rh, 1 wt. % Sn, 0.5 wt. % Ir, 2 wt. % Mg (by weight of the supported catalyst) supported on 20-30 mesh MgO granules.

Although the above-described sequential impregnation steps, with intermediate drying and calcination, of each precursor, are preferred, the same precursor compounds may instead be mixed together and impregnated in fewer steps to yield a catalyst that has at least some $H_2S$-selectivity. In the latter case, however, the resulting catalyst composition is less consistent in terms of reproducibility of performance data, and its stability in terms of catalyst life on stream, and other physical properties and functional characteristics have poor reproducibility from one batch of catalyst to another. Thus, catalysts prepared by methods other than stepwise impregnation are less desirable. Further tests on the above-described representative catalyst compositions were conducted using feeds having various concentrations of $CH_4$: $H_2S$, and employing different air/$H_2S$ ratios. The tests were carried according to the following procedure.

EXAMPLE 2

The catalyst was evaluated for its ability to catalyze the catalytic partial oxidation of methane and the catalytic partial oxidation of hydrogen sulfide in a modified conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 45 pores per linear inch) were placed before and after the catalyst as radiation shields. The catalyst bed including the radiation shields was approximately 12 mm in diameter×8 cm in height, and contained about 3 grams of catalyst granules. The inlet radiation shield also aided in uniform distribution of the feed gases. An Inconel™-sheathed, single point K-type (Chromel™/Alumel™) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater was placed around the quartz tube, providing heat to light off the reaction and to preheat the feed gases. The bottom of the band heater corresponded to the top of the upper radiation shield.

To evaluate the ability of the representative catalysts to catalyze $H_2S$-containing hydrocarbon streams, the above-described testing procedure was carried out using various proportions of $CH_4$:$H_2S$ and at various air/$H_2S$ ratios. Control of the air/$H_2S$ ratio was found to be important to avoid a loss in S yield while treating such streams. Unless stated otherwise, the runs were conducted at a volumetric Air/($H_2S$ hydrocarbons) ratio (Air/fuel ratio) of 0.6-2.4, a preheat temperature of 200-250° C., and a combined flow rate of 1,500-3,000 cc/mm (1.5-3 standard liters per minute (SLPM)), corresponding to a gas hourly space velocity (GHSV) of about 50,000-100,000 $hr^{-1}$, and at a pressure of 5 psig (136 kPa).

The data reported in Tables 2-7 were obtained after approximately 1 hour on stream at the specified conditions.

TABLE 2

Selective Catalyst Performance with Methane-containing $H_2S$ feed Catalyst-4

| Air/fuel Ratio | % $H_2S$ in feed | % $CH_4$ in feed | $CH_4$ Conv. (%) | $S^0$ Yield (%) | $S^0$ Selectivity (%) | $SO_2$ Yield (%) | $SO_2$ Selectivity (%) |
|---|---|---|---|---|---|---|---|
| 2.4 | 91% | 9% | 71.95 | 65.96 | 92.6 | 5.30 | 7.4 |
| 2.4 | 67% | 33% | 41.78 | 37.17 | 98.8 | 0.45 | 1.2 |
| 2.4 | 50% | 50% | 19.10 | 38.98 | 99.3 | 0.29 | 0.7 |
| 2.2 | 50% | 50% | 14.09 | 44.58 | 98.8 | 0.54 | 1.2 |
| 1.8 | 50% | 50% | 5.83 | 54.09 | 96.6 | 1.93 | 3.4 |
| 1.6 | 50% | 50% | 3.07 | 57.23 | 97.0 | 1.75 | 3.0 |
| 1.55 | 40% | 60% | 0.07 | 57.56 | 95.7 | 2.57 | 4.3 |

As shown in Table 2, by controlling the amount of oxygen added, essentially complete methane slip could be achieved with greater than 50% elemental sulfur yield from $H_2S$. Hence no data is shown for CO and $CO_2$ yields and hydrocarbon conversion. More specifically, catalysts comprising Pt/Rh/Ir/Sn/Mg supported on alumina or magnesium oxide, when tested with a mixture of $CH_4$ and $H_2S$ at $H_2S$ concentrations from 99 vol. % to 40 vol. %, and at air/$H_2S$ ratios from 2.4 to 1.2, showed more than 57% sulfur yield from $H_2S$ at more than 95% sulfur selectivity and less than 0.1% $CH_4$ conversion at 40% $H_2S$ composition and 1.55 Air/$H_2S$ ratio. In addition to using an $H_2S$ selective catalyst composition, careful control of the air/$H_2S$ ratio control is also highly preferred in order to avoid loss in sulfur yield while treating hydrocarbon- and $H_2S$-containing streams. Additionally, the preheat temperature of the feed gases to the reactor are preferably adjusted such that, by increasing this temperature in small increments, the reaction stability and selectivity is maintained. For example, by increasing the preheat temperature from about 200° C. to 300° C. we have been able to sustain the reaction at Air/$H_2S$ ratios as low as 1.20 and still obtain sulfur yield greater than 50% at sulfur selectivity greater than 99%.

Tables 3-6 present data obtained with the hydrocarbon part of the feed composed of 95% $CH_4$ and 5% $C_2H_6$ instead of 100% $CH_4$ to evaluate the effect of higher hydrocarbons.

TABLE 3

Selective Catalyst Performance with Methane + Ethane-containing $H_2S$ feed Catalyst-1

| Air/fuel ratio | % $H_2S$ in feed | % HC in feed | % $CO_2$ in feed | % S yield | % $SO_2$ yield | % $H_2S$ yield | % CO yield | % $CO_2$ yield | % HC conv |
|---|---|---|---|---|---|---|---|---|---|
| 1.84 | 76.99 | 15.27 | 7.74 | 60.9 | 2.2 | 63.1 | 0.0 | 70.2 | 70.2 |
| 1.58 | 66.70 | 26.61 | 6.70 | 61.6 | 3.6 | 65.2 | 0.0 | 42.8 | 42.8 |
| 1.47 | 62.51 | 31.21 | 6.28 | 62.5 | 3.5 | 66.0 | 0.0 | 35.5 | 35.5 |
| 1.38 | 58.85 | 35.25 | 5.90 | 62.4 | 3.9 | 66.3 | 0.0 | 30.1 | 30.1 |
| 1.30 | 55.54 | 38.88 | 5.58 | 61.9 | 4.4 | 66.3 | 0.0 | 26.7 | 26.7 |
| 1.23 | 52.57 | 42.15 | 5.28 | 60.9 | 6.5 | 67.4 | 0.0 | 23.3 | 23.3 |
| 1.16 | 49.93 | 45.05 | 5.01 | 57.9 | 8.4 | 66.3 | 0.0 | 21.5 | 21.5 |
| 1.14 | 43.98 | 50.92 | 5.10 | 52.9 | 15.7 | 68.6 | 0.0 | 12.6 | 12.6 |
| 1.26 | 39.91 | 55.46 | 4.63 | 48.1 | 20.5 | 68.6 | 0.0 | 16.3 | 16.3 |

TABLE 4

Selective Catalyst Performance with Methane + Ethane-containing $H_2S$ feed Catalyst-2

| Air/fuel ratio | % $H_2S$ in feed | % HC in feed | % $CO_2$ in feed | % S yield | % $SO_2$ yield | % $H_2S$ yield | % CO yield | % $CO_2$ yield | % HC conv |
|---|---|---|---|---|---|---|---|---|---|
| 1.84 | 77.09 | 15.17 | 7.74 | 67.4 | 7.5 | 75.0 | 9.2 | 90.6 | 99.8 |
| 1.70 | 71.55 | 21.26 | 7.18 | 65.2 | 7.3 | 72.4 | 6.9 | 92.6 | 99.6 |
| 1.70 | 71.55 | 21.26 | 7.18 | 65.3 | 6.5 | 71.8 | 7.3 | 44.5 | 51.8 |
| 1.58 | 66.73 | 26.58 | 6.69 | 63.8 | 7.6 | 71.3 | 4.9 | 37.0 | 42.0 |
| 1.47 | 62.48 | 31.24 | 6.28 | 53.9 | 16.2 | 70.1 | 2.5 | 28.2 | 30.7 |
| 1.44 | 58.82 | 35.28 | 5.91 | 52.2 | 14.7 | 66.9 | 1.6 | 21.3 | 22.9 |
| 1.42 | 55.54 | 38.88 | 5.58 | 48.9 | 16.4 | 65.3 | 1.3 | 17.6 | 18.8 |
| 1.33 | 51.93 | 42.04 | 6.03 | 48.0 | 15.8 | 63.8 | 0.0 | 15.6 | 15.6 |

TABLE 5

Selective Catalyst Performance with Methane + Ethane-containing $H_2S$ feed Catalyst-3

| Air/fuel ratio | % $H_2S$ in feed | % HC in feed | % $CO_2$ in feed | % S yield | % $SO_2$ yield | % $H_2S$ yield | % CO yield | % $CO_2$ yield | % HC conv |
|---|---|---|---|---|---|---|---|---|---|
| 1.84 | 77.09 | 15.17 | 7.74 | 62.6 | 6.2 | 68.7 | 13.7 | 56.6 | 70.3 |
| 1.70 | 71.55 | 21.26 | 7.18 | 54.7 | 11.6 | 66.3 | 8.3 | 43.3 | 51.5 |
| 1.58 | 66.70 | 26.61 | 6.70 | 52.9 | 12.3 | 65.2 | 5.5 | 35.1 | 40.6 |
| 1.47 | 62.51 | 31.21 | 6.28 | 53.9 | 10.6 | 64.5 | 3.9 | 29.4 | 33.3 |
| 1.38 | 58.82 | 35.28 | 5.91 | 55.1 | 8.9 | 64.0 | 2.9 | 24.5 | 27.4 |
| 1.30 | 55.54 | 38.88 | 5.58 | 54.8 | 8.7 | 63.5 | 2.2 | 21.0 | 23.2 |

TABLE 6

Selective Catalyst Performance with Methane + Ethane-containing H₂S feed Catalyst-4

| Air/fuel ratio | % H₂S in feed | % HC in feed | % CO₂ in feed | % S yield | % SO₂ yield | % H₂S yield | % CO yield | % CO₂ yield | % HC conv |
|---|---|---|---|---|---|---|---|---|---|
| 2.01 | 77.01 | 15.26 | 7.73 | 58.1 | 2.4 | 60.5 | 21.3 | 62.5 | 83.7 |
| 1.86 | 71.55 | 21.26 | 7.18 | 50.3 | 2.0 | 52.4 | 19.0 | 51.1 | 70.1 |
| 1.72 | 66.70 | 26.61 | 6.70 | 50.9 | 2.5 | 53.4 | 15.8 | 43.0 | 58.8 |
| 1.61 | 62.51 | 31.21 | 6.28 | 47.4 | 5.1 | 52.6 | 13.4 | 38.9 | 52.3 |
| 1.51 | 58.79 | 35.30 | 5.91 | 49.0 | 4.5 | 53.5 | 9.7 | 34.0 | 43.8 |
| 1.34 | 52.57 | 42.15 | 5.28 | 51.3 | 7.0 | 58.3 | 5.8 | 30.5 | 36.3 |
| 1.27 | 50.00 | 45.05 | 4.95 | 54.8 | 5.0 | 59.8 | 4.6 | 27.7 | 32.2 |
| 1.09 | 43.40 | 52.24 | 4.36 | 55.5 | 8.9 | 64.4 | 1.5 | 16.8 | 18.2 |
| 1.00 | 43.35 | 52.30 | 4.36 | 53.0 | 8.3 | 61.3 | 0.6 | 10.2 | 10.9 |
| 0.92 | 39.95 | 55.43 | 4.62 | 54.0 | 8.3 | 62.3 | 0.0 | 8.9 | 8.9 |
| 0.82 | 35.53 | 60.35 | 4.12 | 55.4 | 5.1 | 60.5 | 1.4 | 9.3 | 10.7 |
| 0.77 | 33.66 | 62.43 | 3.90 | 56.2 | 5.9 | 62.0 | 1.1 | 8.1 | 9.1 |
| 0.78 | 33.75 | 62.02 | 4.23 | 55.5 | 7.7 | 63.2 | 1.1 | 9.1 | 10.2 |
| 0.78 | 33.71 | 62.06 | 4.23 | 58.5 | 6.3 | 64.8 | 1.1 | 7.8 | 9.0 |
| 0.73 | 31.93 | 64.07 | 4.00 | 57.9 | 6.7 | 64.7 | 0.8 | 6.7 | 7.5 |

Comparison of the catalysts' performance at low hydrocarbon concentration of 15% shows that Catalyst-2 has the highest S yield activity (67%). On the other hand, comparison at a medium hydrocarbon concentration of 39% shows that other catalyst compositions fared better in terms of S yield. Catalyst performance is compared at the highest possible hydrocarbon concentration for each catalyst in Table 7 and in the bar graph shown in FIG. 1.

catalyst also showed the highest S yield (58%), lowest SO₂ yield (3%) and lowest hydrocarbon conversion (none).

A common problem associated with conventional Claus operations on such mixed feeds is the formation of high amounts of COS and CS₂. As shown here, this problem is overcome in the present catalytic partial oxidation process, which takes advantage of the selective nature of certain catalysts for producing elemental sulfur instead of SO₂ or

TABLE 7

Catalyst Comparison At Highest Hydrocarbon Concentration

| Catalyst I.D. | Air/fuel ratio | % H₂S in feed | % HC in feed | % CO₂ in feed | % S yield | % SO₂ yield | % H₂S conv. | % CO yield | % CO₂ yield | % HC conv |
|---|---|---|---|---|---|---|---|---|---|---|
| 1 | 1.26 | 39.91 | 55.46 | 4.63 | 48.09 | 20.54 | 68.63 | 0.00 | 16.29 | 16.29 |
| 2 | 1.33 | 51.93 | 42.04 | 6.03 | 48.00 | 15.84 | 63.84 | 0.00 | 15.55 | 15.55 |
| 3 | 1.30 | 55.54 | 38.88 | 5.58 | 54.82 | 8.66 | 63.48 | 2.15 | 21.01 | 23.16 |
| 4 | 0.73 | 31.93 | 64.07 | 4.00 | 57.92 | 6.74 | 64.66 | 0.81 | 6.71 | 7.52 |

It was concluded from these tests that Catalyst-4, containing 1% Rh-1% Pt/1% Sn/0.5% Ir/2% Mg on MgO granules, showed the most selectivity for sulfur formation over hydrocarbon oxidation for light alkane streams containing H₂S. While other catalysts suffered from loss of S yield performance and higher hydrocarbon conversion, all of them showed selective conversion of H₂S over hydrocarbons to different levels. With Catalyst-4 an elemental sulfur (S) yield of almost 58% was observed, with less than 8% total hydrocarbon conversion. When the hydrocarbon conversion was calculated with respect to individual hydrocarbons, methane conversion was only 0.13% and ethane conversion was only 38%. In the catalyst screening tests using methane feed as shown in Table 2 and FIG. 1, this other sulfur-containing compounds, and their selectivity for converting the H₂S component rather than the methane or other light hydrocarbon component of the feed.

A test for the effect of higher hydrocarbons in the H₂S feed was performed by using a hydrocarbon composition of 94% methane-4.5% ethane-1% n-propane-0.5% n-butane (referred to as "Methane-Butane" feed) instead of 100% $CH_4$ with Catalyst-4. In addition, to examine the effect of short contact time partial oxidation reaction on H₂S versus hydrocarbons, a short bed (1.7 grams compared to standard 3 grams) of Catalyst-4 was tested. The results are compared in Table 8. In these tables, the comparison data is indicated by underlining. The shorter catalyst bed allowed for higher GHSV than the longer bed at similar gas flow rates.

TABLE 8

Effect of Short Catalyst Bed With Methane-Butane Feed Catalyst-4

| Catalyst Bed Size | Air/fuel ratio | % H₂S in feed | % HC in feed | % CO₂ in feed | % S yield | % SO₂ yield | % H₂S conv. | % CO yield | % CO₂ yield | % HC conv |
|---|---|---|---|---|---|---|---|---|---|---|
| Short, 1.7 grams | 1.65 | 63.43 | 29.22 | 7.35 | 44.2 | 10.1 | 54.2 | 4.3 | 31.1 | 35.4 |
| | 1.30 | 50.94 | 43.15 | 5.91 | 43.4 | 6.3 | 49.7 | 1.4 | 16.8 | 18.2 |

TABLE 8-continued

Effect of Short Catalyst Bed With Methane-Butane Feed Catalyst-4

| Catalyst Bed Size | Air/fuel ratio | % $H_2S$ in feed | % HC in feed | % $CO_2$ in feed | % S yield | % $SO_2$ yield | % $H_2S$ conv. | % CO yield | % $CO_2$ yield | % HC conv |
|---|---|---|---|---|---|---|---|---|---|---|
| Standard, 3 grams | 1.61 | 62.51 | 31.21 | 6.28 | 47.4 | 5.1 | 52.6 | 13.4 | 38.9 | 52.3 |
| | 1.27 | 50.00 | 45.05 | 4.95 | 54.8 | 5.0 | 59.8 | 4.6 | 27.7 | 32.2 |
| | 0.73 | 31.93 | 64.07 | 4.00 | 57.9 | 6.7 | 64.7 | 0.8 | 6.7 | 7.5 |

Comparison of S yield and hydrocarbon conversion at similar conditions shows that longer catalyst bed resulted in higher S yield, lower $SO_2$ yield and higher hydrocarbon conversion but shorter catalyst bed still showed the selective performance of the catalysts.

A representative catalyst that is active for selectively catalyzing the partial oxidation of $H_2S$ to elemental sulfur according to Reaction III, while allowing light hydrocarbon components of the stream to slip by unreacted preferably comprises Pt, Rh, Ir, Sn, and Mg and is supported on a refractory support, which is preferably a magnesium oxide support. Another preferred catalyst comprises one or more metal chosen from the group consisting of Pt, Rh, Ir, Ru, Pd, Mn, Sn, Sm, Ce and Mg. A preferred refractory support is chosen from the group consisting of alumina, zirconia and magnesium oxide. The sulfur-selective catalyst is preferably in the form of a bed of discrete or divided structures, such as particles or granules, or it may be in the form of a porous monolith. The catalyst may be formed entirely of catalytic material, i.e., without an additional support, or it may comprise one or more catalytic components supported on a non-catalytic refractory support. The catalyst is preferably configured such that there is sufficient porosity, or sufficiently low resistance to gas flow, to permit a stream of the reactant gas mixture to pass over the catalyst at a gas hourly space velocity (GHSV) of at least about 20,000 $hr^{-1}$, preferably at least 100,000 $hr^{-1}$, when the reactor is operated to recover elemental sulfur from an $H_2S$ containing gas. GHSVs in the range of 500,000-10,000,000 $hr^{-1}$ are highly preferred for optimizing space-time yields. By exercising care in selecting the catalyst composition, catalyst materials that have significant activity for catalyzing hydrocarbon reactions under the $H_2S$ partial oxidizing conditions are avoided. For example, platinum tends to be a good choice because most hydrocarbon reactions catalyzed by platinum are poisoned by the presence of sulfur. By contrast, most of the conventional $H_2S$ direct oxidation processes employ metal oxide catalysts or supports that may have some acidic character which tends to promote catalysis of hydrocarbon cracking and dehydrogenation reactions, leading to coke or tar formation. Also, it is preferred to feed insufficient $O_2$ (based on oxidation stoichiometry) to the reaction zone to permit partial oxidation of any $H_2$ or hydrocarbon in the $H_2S$-containing feed. Thus, only enough $O_2$ is provided to partially oxidize $H_2S$ to elemental sulfur and $H_2O$.

A catalyst bed for a the $H_2S$ catalytic partial oxidation process may comprise a quantity of such impregnated or coated granules, or other forms of support such as beads, pills, pellets, cylinders, trilobes, extrudates, spheres, other rounded shapes or other manufactured configurations, or irregularly shaped particles. While MgO or alumina is preferred, other satisfactory supports comprise a refractory material such as zirconia, cordierite, titania, mullite, zirconia-stabilized alumina, MgO stabilized zirconia, MgO stabilized alumina, niobia or a mixture of any of those materials, or another suitable refractory material. Alumina is preferably in the form of alpha-alumina, however the other forms of alumina may also be used.

System A, and Process for Sweetening a Light Hydrocarbon Stream Containing a Low Concentration of $H_2S$.

Figure 2:
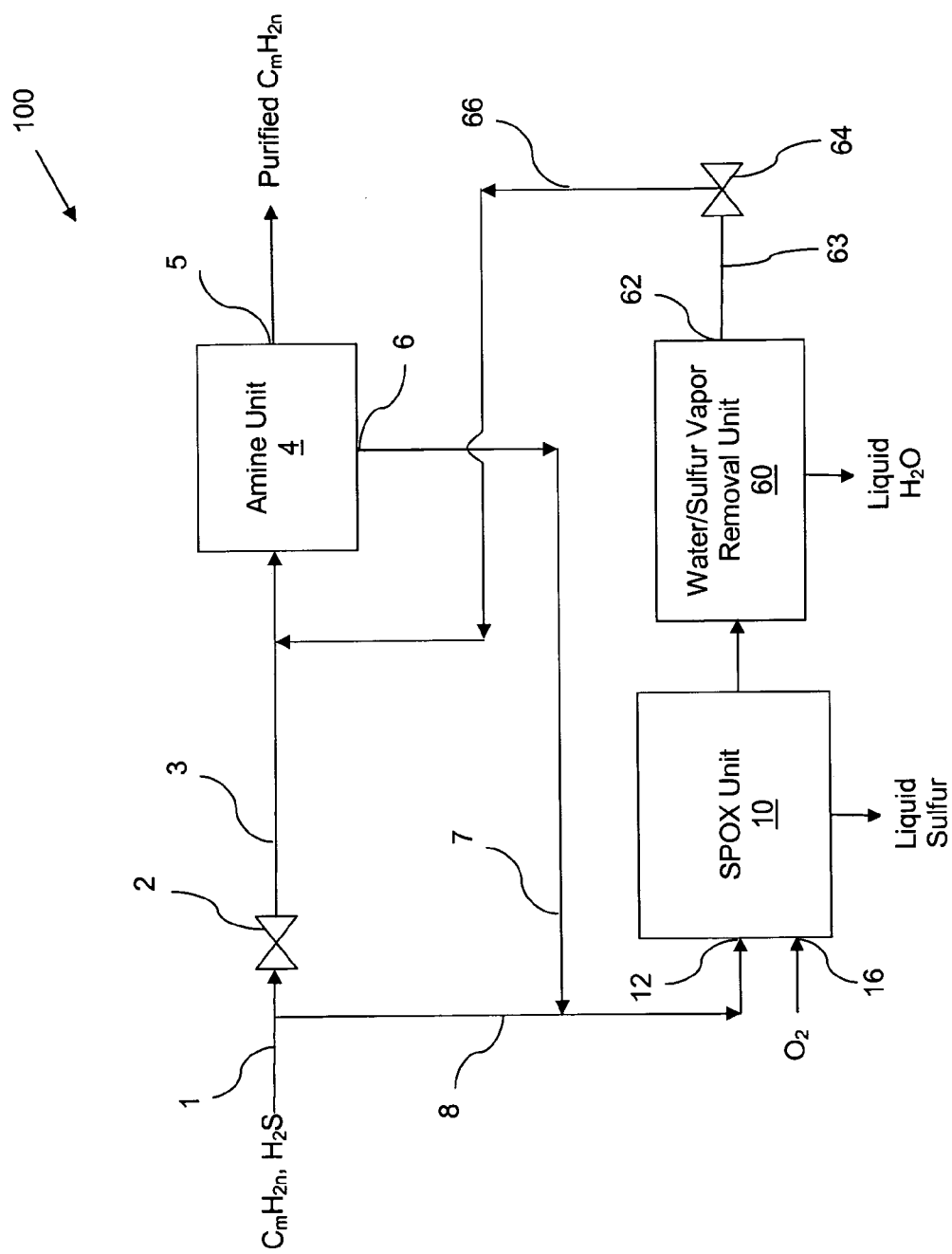
FIG. 2 is a schematic flow diagram showing one embodiment of a process and apparatus in accordance with the present invention.
Figure 3:
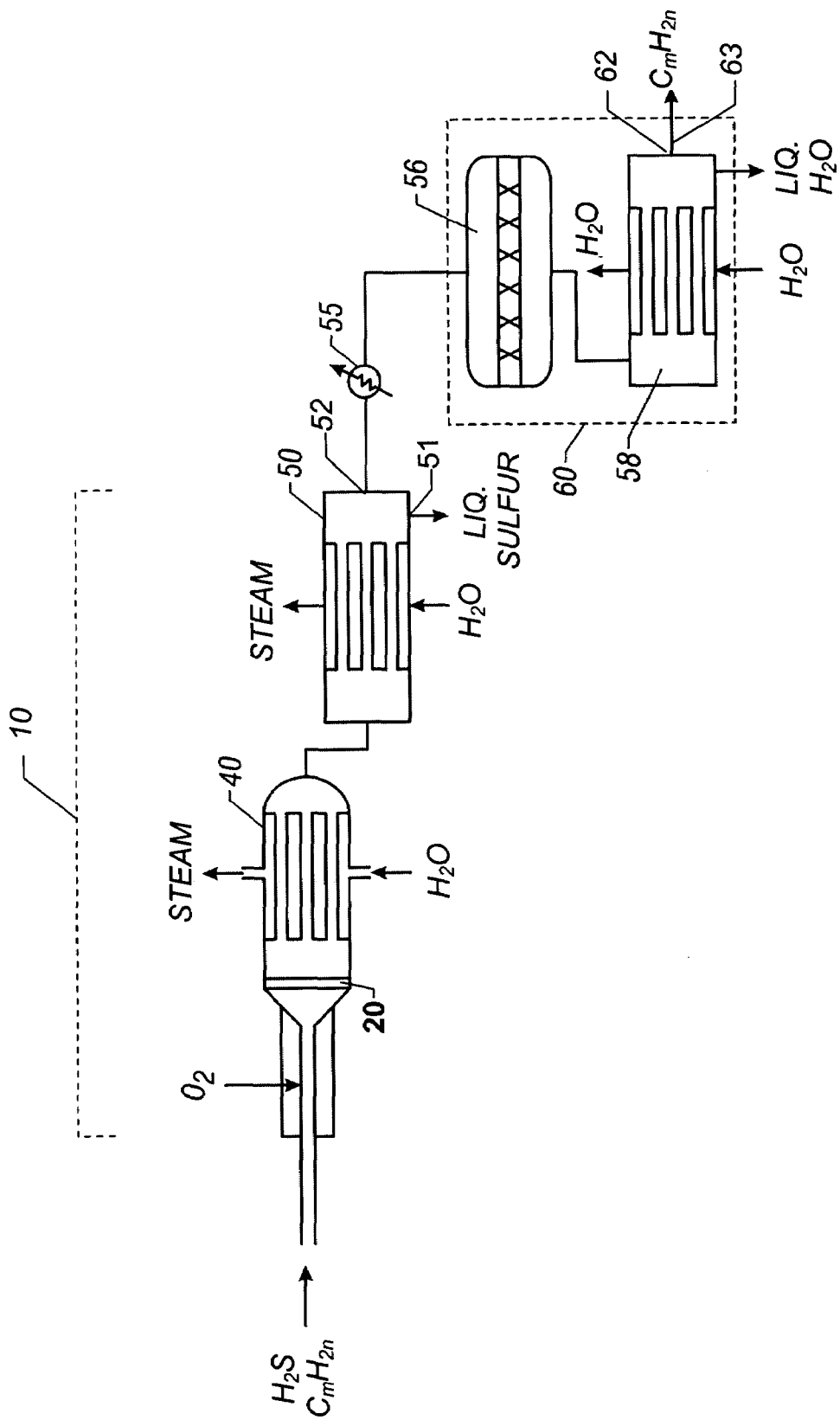
FIG. 3 is a schematic diagram of an assembly including a SPOX unit and water/sulfur vapor removal unit, as employed in the process and apparatus of FIG. 2.

Referring to FIG. 2 a schematic diagram of a preferred hydrocarbon purification system 100 and process for the selective partial oxidation of the $H_2S$ component of a low concentration $H_2S$-containing light hydrocarbon stream are shown. The light hydrocarbon contains one or more $C_1$-$C_5$ alkane, such as methane or natural gas. As explained in more detail below, this configuration is preferred for treating a hydrocarbon stream containing a "low" concentration of $H_2S$, as defined earlier. The system 100 generally includes a feed gas inlet line 1, valve 2, amine unit 4, SCTR unit 10 and water/sulfur vapor removal unit 60. "SPOX" refers to the selective partial oxidation of $H_2S$, and "$C_mH_{2n}$" refers to one or more alkane in which m=1 to 5 and m=2-6. Feed gas inlet line 1 connects to valve 2 and to feed line 8, which connects to one or more inlet 12 of SPOX unit 10. SPOX unit 10 also includes an $O_2$ inlet 16. In FIG. 3 an assembly comprising a basic SPOX unit 10 and water/sulfur vapor removal unit 60, as employed in the system of FIG. 2, are shown. SPOX unit 10 generally includes short contact time reactor 20, boiler 40 and sulfur condenser 50, which has a liquid sulfur outlet 51 and a desulfurized gas outlet 52.

Figure 4:
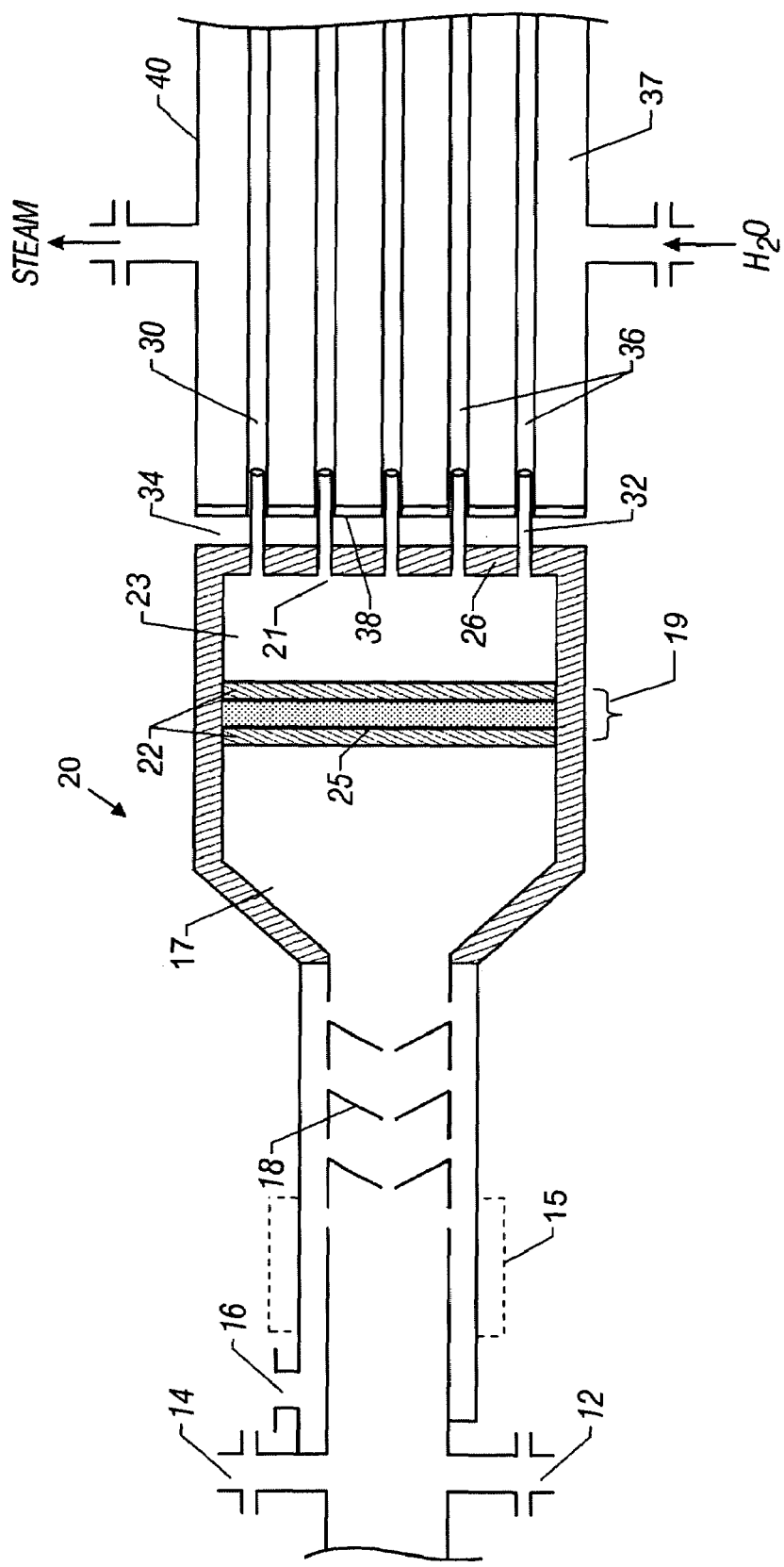
FIG. 4 is a schematic cross-sectional view of a short contact time reactor as employed in the apparatus and method of FIG. 2.

A preferred short contact time reactor 20 is schematically shown in FIG. 4, in longitudinal cross-sectional view. Reactor 20 is preferably a very fast contact (i.e., millisecond range)/fast quench (i.e., less than one second) reactor which is constructed so as to be capable of withstanding the temperatures generated in a net catalytic partial oxidation reaction, which may sometimes go as high as 1,500° C. The short contact time reactor is preferably similar to those that are known for carrying out catalytic partial oxidation (CPOX) of light hydrocarbons and which have been described in the literature, such as U.S. Pat. Nos. 6,635,191 and 6,733,692 (issued to ConocoPhillips Company), and as discussed above in the "Definitions."

Referring still to FIG. 4, reactor 20 preferably includes at least one feed injection opening 12, air/$O_2$ inlet 16, an optional preheater 15, a mixing zone 17, a reaction zone 19 and a cooling zone 23. Reaction zone 19 preferably includes a pair of thermal radiation barriers or shields 22 positioned immediately upstream and downstream of a $H_2S$-selective catalyst 25 in a fixed-bed configuration. Radiation barriers 22 are preferably made of porous ceramic or refractory material that can withstand the contemplated operating temperatures and provide some amount of thermal insulation. At least the reaction zone and cooling zones of reactor 20 are preferably lined a refractory material 26. Adjacent the second (downstream) thermal shield 22 is cooling chamber 23 which includes ceramic ferrules 32 embedded in refractory material 26, and a tube sheet 34 containing a plurality of thermally conductive tubes 36. Tubes 36 extend from the process (reacted) gas outlets 21 of reactor 20 through boiler 40 for cooling the reacted gases. Boiler 40 may be similar to a conventional waste heat boiler or fire tube boiler, as illustrated in FIG. 3, however, it must be capable of withstanding the requisite pressures and temperatures of the process which is described in more detail below. Tube sheet 34 forms a divider between the process gas and the boiling water where the hot process gas exits the reactor and enters boiler 40. Tubes 36 are preferably made of carbon steel. The initial portion of each tube 36 (i.e., the portion which will first encounter the hot gases, when the system is used in the process described in more detail below) is preferably protected by ceramic ferrules 32 embedded in refractory material 26, to provide thermal insulation to the underlying metal. Following boiler 40 is sulfur condenser 50 for receiving and further cooling the reacted gases to below the condensation point of sulfur and providing for the removal of liquid sulfur product, as shown in FIG. 3. Following sulfur condenser 50 is heater 55 and water/sulfur vapor removal unit 60. Unit 60 contains a hydrogenation/hydrolysis catalyst which is preferably similar to those employed in conventional Claus tail gas treatment processes (such as Beavon Sulfur Removal™ (BSR™) or Shell Claus Offgas Treating™ (SCOT™), for example), where sulfinur vapor and $SO_2$ are hydrogenated to $H_2S$ and COS and $CS_2$ are hydrolyzed to $H_2S$ and $CO_2$. A condenser 58 follows reactor 56 for condensing water vapor from the treated hydrocarbon gas stream and having an outlet 62 and line 63 for removal of the product gas.

Referring again to FIG. 2, hydrocarbon gas containing the remaining $H_2S$ goes in line 66 from valve 64 to line 3, which leads to the inlet of amine unit 4. Amine unit 4 has a purified gas outlet 5 and regenerated $H_2S$ outlet 6 that connects to line 7. Line 7 joins with line 8, which joins to at least one inlet 12 of SPOX unit 10.

Process A—Low $H_2S$ Concentration in a Light Hydrocarbon Feed. In operation, a feed gas stream comprising one or more light hydrocarbon and a relatively low concentration of $H_2S$ enters the above described system 100 (FIG. 2), via line 1. At valve 2 the feed gas flow is regulated such that the stream is split into two portions which enter line 3 and line 8, respectively. The first portion of the feed gas enters amine unit 4 via line 3, where it subjected to amine extraction and $H_2S$ regeneration using conventional techniques, and the resulting purified hydrocarbon gas exits at outlet 5. The regenerated $H_2S$ leaves amine unit 4 at $H_2S$ outlet 6 and combines with the second portion of the original feed gas in line 8. As a result, the total $H_2S$ concentration of the feed that enters reactor 20 of SPOX unit 10 is increased relative to the original feed gas stream, which facilitates maintenance of the above-described high reaction temperature and autothermal reaction conditions. The feed is split between line 3 and line 8 to maintain an approximate methane to $H_2S$ ratio of 1:1-2:1 in stream 12. The feed gas and/or the oxygen-containing stream are preferably preheated before being introduced into reactor 20 (FIG. 3).

Referring now to FIG. 4, the feed gas and the $O_2$-containing stream are injected into reactor 20 via one or more inlets, such as inlets 12, 14 and 16. It should be understood that the number, arrangement and configuration of the inlets may be varied from those shown, without altering the basic process described herein. Conventional equipment as is customarily used for injecting gas into short contact time reactors at high flow rates may be used to feed the reactant gases at atmospheric, or preferably superatmospheric pressure. Oxygen entering reactor 20 via inlet 16 is mixed with the $H_2S$ and hydrocarbon gases in mixing zone 17, to form a reactant gas mixture. Air, or an oxygen enriched air stream may be used instead of pure oxygen; however, substantially pure oxygen is preferred as it prevents the inclusion of inert gases such as nitrogen and argon in the system. A mixer, such as static mixer 18, is preferably employed to ensure thorough mixing of the gases. Thorough mixing deters the occurrence of unwanted side reactions and temperature excursions in reaction zone 19. The individual gas feeds may be preheated, e.g., by passing them through the tube side of steam heat exchangers where 600-psig steam is circulated on the shell side.

Alternatively, or additionally to preheating the feed gases in zone 17, the gases entering the reactor may be electrically heated or steam heated using a pre-heater 15 surrounding a section of the gas entry tube. The inclusion of a pre-heater 15, such as an electrical or steam heating jacket, may be desirable in situations where there is a possibility of the mixed gas feed temperature dropping below a desired inlet temperature to reactor 20, (e.g., about 200° C.).

Referring still to FIG. 4, from mixing zone 17 of reactor 20, the reaction mixture passes through a porous first thermal radiation shield 22. First radiation shield 22 deters pre-ignition of the reaction mixture before entering reaction zone 19 and contacting catalyst 25. Since pre-ignition causes unwanted side reactions and potentially an overpressure of the reactor vessel, rapid mixing of the gases and avoidance of dead spaces or gas stagnation areas are important considerations in reactor design and operation, to prevent having a stagnant explosive mixture form in the reactor. Minimum contact time between the $O_2$ and $H_2S$ can also be facilitated by placing inert filler in any void spaces in the piping upstream of the catalytic section or reaction zone. Although it is not mandatory, it is preferable to preheat the reactant gas mixture to at least about 200° C. to facilitate initiation of the catalytic reaction in reaction zone 19. To minimize pre-ignition and the occurrence of undesirable gas phase reactions, the reactant gases are preferably not heated above about 350° C. It is highly preferred to keep the preheat temperature below 500° C. However, in order to deter possible inactivation or sulfur poisoning of the catalyst, it is preferable to keep the temperature of the catalyst above about 500° C. while it is exposed to the $H_2S$-containing stream. It is highly preferred to keep the reactor temperature above 700° C., preferably between 850° C. and 1,450° C. Preferably the $H_2S$ to $O_2$ molar ratio in the reactant gas mixture is in the range 4:1-3:1.

The chosen catalyst composition is selective to the conversion of $H_2S$. Care is preferably taken to provide to the reactor no more than the amount of oxygen necessary to support Reaction III. To further reduce or minimize combusting or partially oxidizing the light hydrocarbon components of the natural gas stream and to promote the selective oxidation of $H_2S$ to sulfur, short catalyst contact time and favorable catalyst composition are employed. The configuration of the catalyst 25 is preferably such that the contact time between the reactant gas mixture and the catalyst is in the range of about 0.1 to 200 milliseconds. This very brief gas residence time on the catalyst is important to minimize or eliminate the formation of $SO_2$, which would restrict the recovery of sulfur by establishing the Claus equilibrium of Reaction II. When employing a catalyst monolith or packed bed of divided catalyst, the surface area, depth of the catalyst bed, and gas flow rate (space velocity) are preferably managed to ensure the desired short contact time, i.e., less that 200 milliseconds, preferably under 50 milliseconds, more preferably less than 20 milliseconds, and still more preferably 10 milliseconds or less. Preferably the flow of the reactant and product gases is maintained at such a rate that the $H_2S$ partial oxidation process is carried out at superatmospheric pressure (i.e., greater than 1 atmosphere, preferably more than 10 atmospheres, more preferably greater than 50 atmospheres), and the gas hourly space velocity is at least 20,000 $hr^{-1}$, preferably at least 100,000 $hr^{-1}$. Maximum GHSVs are preferred for optimizing space-time yields. GHSVs in the range of 500,000-10,000,000 $hr^{-1}$ are practical in many instances.

As described above, in reaction zone 19 the catalytic surfaces catalyze the partial oxidation of the $H_2S$ directly to sulfur while the hydrocarbon component of the feed slips through substantially unaffected. Maintaining an optimum dwell time range of reactant gases on the catalyst produces a favorable balance between temperature elevation due to the exothermic partial oxidation reaction and the convective removal of heat from the reactor by the rapidly moving product gas stream. Thus, sufficient heat is generated to maintain the catalyst temperature in the range of approximately 700° C.-1,500° C., preferably 850° C.-1,450° C., as measured at the reacted gas outlet 21 (FIG. 4). The temperature of the reaction is maintained in the desired range by regulating the preheat temperature of the reactants, by regulating the oxygen feed rate, by heat exchange, as necessary, or by any combination of those means. It is desirable to quickly cool the reacted gases and condense the sulfur vapor out of the stream to prevent any re-formation of $H_2S$ by the reaction:

$$H_2 + 1/x\ S_x \rightarrow H_2S \qquad (IV)$$

Rapid cooling is facilitated by the presence of the porous second thermal radiation shield 22, located on the downstream side of catalyst 25, which partially insulates the rapidly moving product gases in cooling chamber 23 from the hot catalyst.

Still referring to FIG. 4 the reaction is rapidly quenched as the reacted gases exiting the reaction zone 19 quickly pass through the second thermal shield 22 and begin to cool in cooling chamber 23 of reactor 20. Still rapidly flowing, the reacted gases exit the reactor through outlets 21, where the tube sheet 34 forces the gases to go through the inside of cooling tubes 36 of boiler 40. The rapidly cooling gases flow through tubes 36 inside boiler 40 where they are cooled by circulating boiling water in shell 37 which surrounds tubes 36. Since the carbon steel of the tube sheet may not otherwise withstand the high temperatures of the reacted gases, thermal protection for the metal tubes is highly preferred. For tubes 36, this protection is afforded by the boiling water. Since the boiling water remains at a constant temperature, and since the metal conducts heat so readily, the tubes and most of the tube sheet attain temperatures only slightly above the temperature of the boiling water. This is not the case for the portions of the tube sheet 34 where tubes 36 connect at joints 38, however. Preferably joints 38 and the vulnerable portion of tubes 36 are not exposed to temperatures that exceed the safe operating limits for the metal. Ceramic ferrules 32 embedded in refractory material 26 provide insulation for the initial portion of tubes 36 (i.e., the portion that meets the hot gases first). Thus, only the metal surfaces that are adequately exposed to the boiling water encounters the hot gases. Although a conventional waste heat boiler may be used satisfactorily as boiler 40, any other suitable apparatus could be substituted for rapidly quenching and cooling the gases. The temperature of the cooled gases leaving boiler 40 is still above the dewpoint of the sulfur vapor in the gas, but preferably not less than about 125° C., so that the elemental sulfur component of the reacted gases remains in the vapor phase at the conclusion of the first cooling stage.

Referring again to FIG. 3, in a second cooling stage the partially cooled gaseous product stream flows into a contact condensing device 50 such as a conventional sulfur condenser, where the gases are further cooled to the dew point of elemental sulfur, or below, such that sulfur vapor condenses to form liquid sulfur. Preferably the gas temperature at outlet 52 of condenser 50 is close to the freezing temperature of elemental sulfur, i.e., about 250° F. (121° C.), to minimize the amount of residual elemental sulfur vapor in the gas leaving condenser 50.

Since the purified light hydrocarbon gas emerging from SPOX unit 10 (FIG. 2) may contain a level of residual $H_2S$ that is unacceptable for a particular downstream application of the sweetened hydrocarbon stream, the gas emerging from SPOX unit 10 is preferably sent to water/sulfur vapor removal unit 60. Preferably the gases are first heated in heater 55 to between 200 and 350° C., as shown in FIG. 3. Reactor 56 of water/sulfur vapor removal unit 60 receives the heated gas stream and reacts any sulfur vapor and $SO_2$ present with hydrogen formed in the SPOX reactor to form $H_2S$, and reacts COS and $CS_2$ with water formed in the SPOX reactor to $H_2S$ and $CO_2$ over a suitable catalyst such as a conventional cobalt-molybdenum Claus tail gas hydrogenation catalyst. Condenser 58 receives the treated hydrocarbon stream and condenses water vapor from the treated hydrocarbon gas stream. $SO_2$ and elemental sulfur must be converted to $H_2S$ to avoid the depositing elemental sulfur in water condenser 58. COS and $CS_2$ must be converted to $H_2S$ so the sulfur contained in these molecules can be absorbed in the amine system downstream of condenser 58. A conventional air cooled finned tube heat exchanger or water cooled shell and tube exchanger can be used for condenser 58. The hydrocarbon gas then exits unit 60 at outlet 62 and line 63, as shown in FIG. 2. Preferably valve 64 directs all of the hydrocarbon gas stream into line 66, and the gas flow continues into line 3, and finally feeds into amine unit 4, where it is subjected to conventional amine treatment. Backflow of the gas in line 3 is preferably prevented by operation of valve 2. The purified light hydrocarbon gas emerges from amine unit 4 at outlet 5. Preferably the amount of residual $H_2S$ in the purified hydrocarbon stream exiting outlet 5 of amine unit 4 is controlled to meet the particular specifications of a selected downstream process. The feed gas criteria may vary according to the intended use of the product. For example, the resulting light hydrocarbon gas may be suitable for use as pipeline gas (4 ppmv $H_2S$), or refinery fuel gas (typically 160 ppmv $H_2S$). Referring now to FIGS. 2 and 4, regenerated $H_2S$ travels from amine unit 4 via outlet 6, into line 7 and then into line 8, where it combines with the original feed, or a portion thereof, as it is fed into one or more inlet 12, 14 of SPOX unit 10.

Comparing the above-described Process A to the hydrocarbon treatment and sulfur recovery schemes in current practice in the field, the present process greatly simplifies the flow scheme by reducing the number of process steps and the amount of equipment needed to accomplish those steps. By operating the sulfur recovery at higher pressure, the necessary sulfur recovery equipment can be much smaller than conventional units that are designed for and operated at less than 2 atmospheres.

Figure 6:
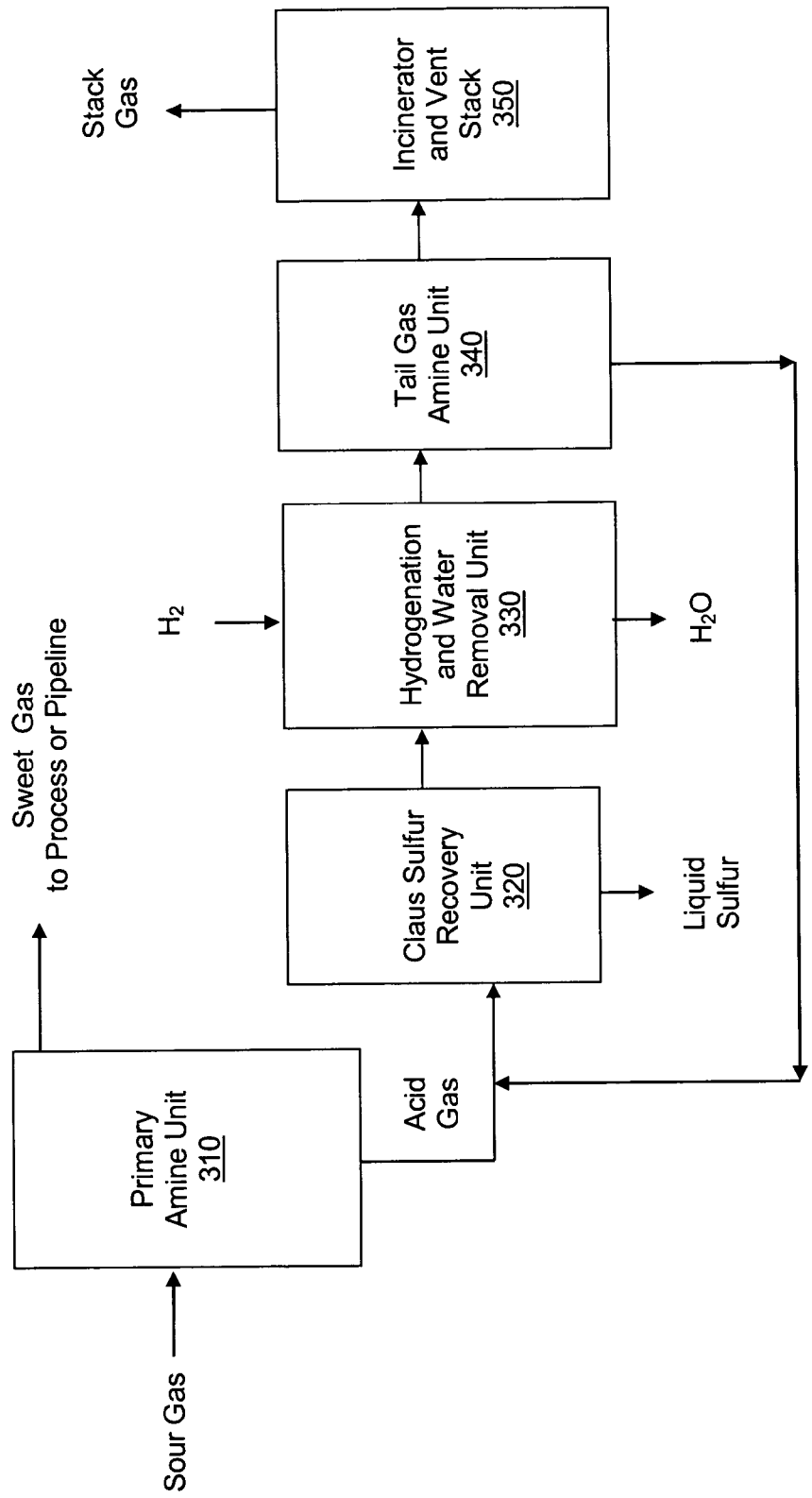
FIG. 6 is a schematic flow diagram showing a prior art process and apparatus configuration.

In marked contrast to the compact systems described above, a conventional prior art gas treating/sulfur recovery system as used today for sweetening natural gas is typically configured as illustrated schematically in FIG. 6. In a typical process, first the sour gas is treated to remove $H_2S$ in a "primary" amine system 310 to the desired specification. $H_2S$ rejected by the amine system goes to a Claus sulfur recovery unit 320 where the $H_2S$ is converted to elemental sulfur. Following the Claus unit 320 is a hydrogenation and water removal unit (330), which generally includes a heater, hydrogenation reactor, quench tower water removal unit, and then a tail gas amine system (340). An incinerator and vent stack 350 typically follow. The primary amine system 310 contains seven major pieces of equipment, including a contactor, regenerator, flash drum, amine cooler, feed/bottoms exchanger, overhead condenser and reboiler (not shown). The Claus unit 320 typically includes ten to thirteen component units, including knockout drum, air blower, reaction furnace/WHB, first condenser, reheaters, catalyst beds and condensers (not shown). The tail gas hydrogenation unit of unit 330 typically comprises three component parts, including a preheater, a reactor and an aftercooler (not shown). The tail gas amine unit 340 commonly has eight components, including a quench tower and quench tower cooler, contactor, regenerator, amine cooler, feed/bottoms exchanger, overhead condenser and reboiler (not shown). All together, the component parts of a conventional gas sweetening/sulfur recovery system customarily total 27 to 29 major pieces of equipment. Thus, the advantages of the compact systems and processes disclosed herein, which require far less apparatus and have a much smaller plant size, are readily apparent.

The process and apparatus configuration depicted in FIG. 2, for example, utilize an amine unit 4 (seven major pieces), the SPOX unit 10 (oxygen and feed gas preheaters, reactor/WFB, and sulfur condenser, for a total of three components), a water/sulfur vapor removal unit 60, (tail gas hydrogenation/water condensation section, including three components), a conventional $H_2S$ compressor (not shown) and a conventional oxygen pump or compressor (not shown), for a total of fifteen primary components. If desired, oxygen could be supplied by providing an oxygen plant, which would add to the equipment cost. However, it is known to those skilled in the art that oxygen supplies can be provided more cheaply through oxygen plants or pipeline oxygen provided by oxygen vendors. In many of the situations where natural gas is to be converted to syngas, an oxygen plant will be included in the syngas plant. Additional capacity can be provided in a neighboring oxygen plant to accommodate the SPOX reactor requirements. The lower equipment count saves significant costs for engineering, interconnecting piping, utility piping, plot space, instruments and contingency costs. Lower equipment counts also help to improve reliability by reducing the potential number of equipment failures.

Using the data from Table 2, and the process configuration of FIG. 2, a process is demonstrated for a feed containing 28% $H_2S$ by volume by the material balance in Table 9. In this instance, which is considered representative of other embodiments, a lower cost, lower purity oxygen stream from a vacuum swing absorption oxygen plant is used to provide the oxygen to the plant as the gas product should be able to accommodate the small amount of nitrogen in the stream.

TABLE 9

Estimated Gas Compositions Resulting from a Lower $H_2S$/High $CH_4$ Feed

|  | Methane Moles | $H_2S$ Moles | $C_1:H_2S$ | % $H_2S$ (vol. %) | $N_2$ Moles | % $N_2$ (vol. %) | $O_2$ | % $O_2$ (vol. %) |
|---|---|---|---|---|---|---|---|---|
| Inlet Gas | 720 | 280 | — | 28 | — | — | — | — |
| Amine Feed | 720 | 200 | — | — | 24.7 | — | — | — |
| Amine-treated Gas | 720 | 0.002979 | — | — | 24.7 | 3.3 | — | — |
| Amine Regeneration Outlet | — | 200 | — | — | — | — | — | — |
| SPOX Feed | 720 | 480 | 1.5 | — | 24.7 | — | 140 | 85 |
| SPOX Effluent | 720 | 200 | — | — | 24.7 | — | — | — |
| Quench Outlet | 720 | 200 | — | — | 24.7 | — | — | — |

Figure 5:
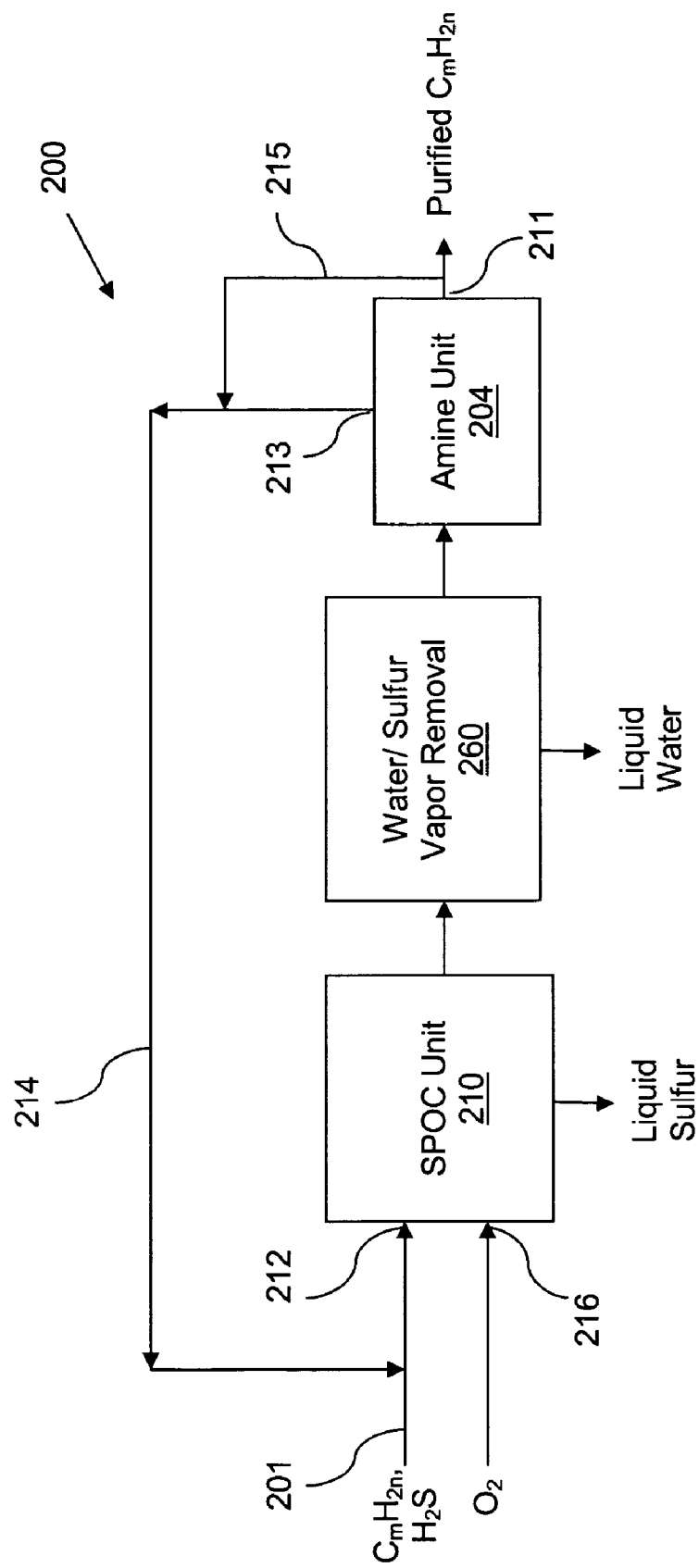
FIG. 5 is a schematic flow diagram showing another embodiment of a process and apparatus in accordance with the present invention.

System B, and Process for Sweetening a Light Hydrocarbon Stream Containing a High Concentration of $H_2S$ Referring now to FIG. 5, a schematic diagram of another preferred hydrocarbon purification system 200 and process for the selective partial oxidation of the $H_2S$ component of a higher concentration $H_2S$-containing light hydrocarbon stream are shown. As explained in more detail below, this configuration is preferred for treating a hydrocarbon stream containing $H_2S$ in the concentration range of about 25 to 50 vol. % $H_2S$. The system 200 generally includes feed gas inlet line 201, SPOX unit 210, a water/sulfur vapor removal unit 260 and an amine unit 204, similar to those employed in the system and process of FIG. 2. Feed gas line 201 connects to at least one inlet 212 of SPOX unit 10. SPOX unit 210 also includes an $O_2$ inlet 216. SPOX unit 210 and water/sulfur vapor removal unit 260 are preferably like their counterparts in System A, described above and shown in FIGS. 2 and 3. Similar to its counterpart in System A, amine unit 204 includes an outlet 211 for the sweetened hydrocarbon gas, and a regenerated $H_2S$ outlet 213 that connects to line 214. Line 214 joins with feed gas line 201.

Process B—High $H_2S$ Concentration in Light Hydrocarbon Feed. In instances in which the hydrocarbon feed stock contains an $H_2S$ concentration of 25 to 50 vol %, it is preferable to use the configuration shown in FIG. 5 instead of using System A, described above and illustrated in FIG. 2. In one scenario, a system like that shown in FIG. 5 is set up at the site of a stranded sour gas well, where a large natural gas formation contains in excess of 25 vol. % $H_2S$. In operation, the selective partial oxidation of the $H_2S$ component of a natural gas stream, the recovery of the sulfur component as elemental sulfur, and the recovery of the purified or sweetened hydrocarbon component is carried out as follows. The natural gas feed enters system 200 via line 201. The feed gas in line 201 is supplemented by a regenerated $H_2S$ stream from line 214, as discussed in more detail below. Similar to Process A, described above, the feed gas and the $O_2$-containing stream are injected into reactor 20, the reactant gas mixture is formed, and the selective catalytic partial oxidation reaction is commenced.

As stated above with respect to Process A, the mixing of the gases must be very thorough to prevent combustion reactions from taking place or from predominating in the reaction zone, e.g., formation of $SO_2$. The amount of oxygen required to convert the $H_2S$ according to Reaction III is provided to the reactor to deter or prevent temperature excursions and unwanted side reactions. The SPOX unit 210 and the water/sulfur vapor removal unit 260 are operated substantially as described above with respect to System A and Process A, for treating low-$H_2S$ streams. Unlike the situation in Process A, however, the $H_2S$ content of the initial feed gas entering the SPOX reactor is sufficient to generate enough heat to maintain the catalyst temperature in the range of approximately 700° C.-1,450° C., preferably 850° C.-1,200° C., as measured at the reactor outlet, without supplying additional $H_2S$. The flow of the reactant and product gases is maintained at such a rate that the $H_2S$ partial oxidation process is carried out at a gas hourly space velocity of at least 20,000 $hr^{-1}$, preferably at least 100,000 $hr^{-1}$, and the SPOX unit is operated at superatmospheric pressure (i.e., greater than 1 atmosphere, preferably more than 10 atmospheres, and more preferably is operated at greater than 50 atmospheres). The partial oxidation reaction, quenching, cooling, sulfur condensation, and water/sulfur vapor removal are carried out substantially as described above for Process A.

The unreacted $H_2S$ in the process gas emerging from unit 260 is picked up by amine unit 204 and returned to the feed gas inlet of the SPOX unit 210 as regenerated $H_2S$, via outlet 213 and lines 214 and 212. The sweetened natural gas exits the amine unit 204 at outlet 211, where it can be routed to another process or used as a clean fuel gas. Preferably the process variables are controlled such that the amount of residual $H_2S$ in the purified hydrocarbon stream exiting amine unit 204 is low enough to meet the requirements of the intended downstream process. Limits for $H_2S$ concentration will vary, depending on the type of downstream process in which the hydrocarbon stream is to be used. For example, in many regulatory jurisdictions there is currently a 4 ppmv $H_2S$ limit for pipeline gas, and for refinery fuel gas there is typically a 160 ppmv $H_2S$ limit. The pure elemental sulfur is collected from unit 210 and may be transported for bulk commercial or industrial use.

be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The discussion of a reference in the Description of Related Art is not an admission that it is prior art to the present invention. The disclosures of all patents, patent applications and publications cited herein are hereby incorporated herein by reference, to the extent that they provide exemplary, procedural or other details supplementary to those set forth herein.

What is claimed is:

1. A process of sweetening a light hydrocarbon feed gas stream containing at least one $C_1$-$C_5$ hydrocarbon component and an $H_2S$ component, the process comprising:

at a temperature above about 500° C., at a molar ratio of $H_2S$ to $O_2$ in the range of about 2:1 to about 5:1, and in the presence of a $H_2S$-selective catalyst comprising Pt, Rh, Ir, Sn, and Mg, partially oxidizing the $H_2S$ component in said light hydrocarbon feed gas stream to form elemental sulfur and water without converting more than about 10 mole % of the carbon content of said light hydrocarbon component to CO or $CO_2$;

recovering unreacted light hydrocarbon; and recovering liquid sulfur.

2. The process of claim 1 wherein said catalyst is more active for catalyzing the reaction $H_2O\ S + \frac{1}{2}O_2 \rightarrow S_x + H_2$ (x=2, 6, 8) than for catalyzing the reaction $C_mH_{2n} + m/2\ O_2 \rightarrow m\ CO + n\ H_2$, wherein m=1-5 and n=2-6.

3. The process of claim 1 wherein said partial oxidizing is carried out at superatmospheric pressure.

4. The process of claim 1 wherein said partial oxidizing is carried out at a space velocity of at least 20,000 $h^{-1}$.

TABLE 10

Calculated Gas Compositions for a High $H_2S$ Concentration Feed

| | Methane (Moles) | $H_2S$ (Moles) | $C_1$:$H_2S$ | % $H_2S$ (vol. %) | $N_2$ (Moles) | % $N_2$ (vol. %) | $S^0$ (Moles) | $O_2$ | % $O_2$ (vol. %) |
|---|---|---|---|---|---|---|---|---|---|
| Inlet Gas | 600 | 400 | 1.5 | 40 | 1.00 | — | — | 199.9 | 99.5 |
| Recycle $H_2S$ | — | 286 | — | — | — | — | — | — | — |
| Recycle Methane | 429 | | | | 0.7 | | | | |
| Amine Unit Outlet | 600 | .002 | — | — | 1.00 | 0.17 | — | — | — |
| Liquid Sulfur | — | — | — | — | — | — | 399.998 | — | — |

Using the yield structure from Table 1 and the flow scheme depicted in FIG. 4, the operation to selectively convert $H_2S$ to sulfur in light hydrocarbon stream is illustrated in Table 10. The main differences between processing a high $H_2S$ feed and a lower concentration feed are the elimination of the bypass line to the amine contactor and the addition of a clean methane recycle to maintain the 1.5:1 methane to $H_2S$ in the feed. In this scheme, the inlet gas combines with both recycle streams and oxygen before entering the reactor.

While the preferred embodiments of the invention have been shown and described, modifications thereof can be made by one skilled in the art without departing from the spirit and teachings of the invention. The embodiments described herein are exemplary only, and are not intended to 5. The process of claim 1 comprising:

combining said light hydrocarbon feed gas stream and an $O_2$ containing stream to form a reactant gas mixture comprising said light hydrocarbon, $H_2S$ and $O_2$;

at a temperature in the range of about 700° C. to about 1,450° C., flowing a stream of said reactant gas mixture over said catalyst in a reaction zone such that the contact time of each portion of reactant gas mixture that contacts said catalyst is sufficiently brief to allow the reaction

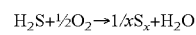

(x =2, 6 or 8) to occur, whereby a reacted gas stream is formed comprising gaseous elemental sulfur, water, and unreacted light hydrocarbon;

passing said reacted gas stream into a first cooling zone and cooling said reacted gas stream to a temperature above the condensation point of elemental sulfur but below about 350° C., to yield a partially cooled reacted gas stream;

passing said partially cooled reacted gas stream into a second cooling zone and cooling said partially cooled gas to a temperature to a temperature below the condensation point of elemental sulfur but above the freezing point of elemental sulfur, to yield liquid sulfur and a process gas stream containing unreacted light hydrocarbon, water vapor and residual sulfur vapor;

passing said process gas stream into a sulfur vapor cleanup unit, to convert sulfur vapor and any non-$H_2S$ sulfur compounds to $H_2S$;

passing said gas stream from said cleanup unit into a water condenser to provide a light hydrocarbon stream and liquid water;

passing said partially purified light hydrocarbon stream into an amine absorption/regeneration unit to yield a purified light hydrocarbon stream and a regenerated $H_2S$ stream; and combining said regenerated $H_2S$ stream with said light hydrocarbon stream.

6. The process of claim 5 wherein said light hydrocarbon feed gas stream comprises at least about 25 vol. % $H_2S$.

7. The process of claim 5 wherein said light hydrocarbon feed gas stream contains less than about 25 vol. % $H_2S$, the process further comprising:

splitting said light hydrocarbon feed gas stream into primary and secondary feed gas streams;

passing said primary feed gas stream into said amine absorption unit to yield said purified light hydrocarbon stream and said regenerated $H_2S$ stream;

enriching said secondary feed gas stream with said regenerated $H_2S$ such that the resulting enriched feed gas stream comprises at least 25 vol. % $H_2S$;

combining said enriched secondary feed gas stream and said $O_2$ containing stream to form said reactant gas mixture comprising said light hydrocarbon, $H_2S$ and $O_{02}$.

8. The process of claim 7 wherein said step of combining said regenerated $H_2S$ stream with said light hydrocarbon stream comprises combining said regenerated $H_2S$ stream with said secondary feed gas stream to provide said enriched feed gas stream.

9. The process of claim 1 comprising maintaining an approximately 3:1 molar ratio of $H_2S$ to $O_2$ in said reactant gas mixture.

10. The process of claim 1 comprising preheating said reactant gas mixture to a temperature in the range of about 150° C. to about 350° C. prior to contacting said catalyst.

11. The process of claim 1 wherein said $O_2$-containing gas is chosen from the group consisting of purified $O_2$, and $O_2$ enriched air.

12. The process of claim 1 comprising keeping the temperature of said catalyst at about 700° C.-1,450° C.

13. The process of claim 1 comprising initially heating said catalyst to at least about 700° C. while passing said reactant gas mixture over said catalyst until said $H_2S$ partial oxidation reaction is initiated.

14. The process of claim 1 comprising maintaining reaction promoting conditions such that said $H_2S$ catalytic partial oxidation reaction continues autothermally.

15. The process of claim 1 wherein said catalyst comprising Pt, Rh, Ir, Sn, and Mg is supported on a refractory support.

16. The process of claim 15 wherein said catalyst comprises a mixture of 0.25-5 wt. % Pt, 0.25-5 wt. % Rh, 0.25-5 wt. % Ir, 0.25-5 wt. % Sn and 1-5 wt. % Mg (by weight of the supported catalyst) supported on a refractory support.

17. The process of claim 15 wherein said catalyst further comprises Ru, Pd, Mn, Sm or Ce.

18. The process of claim 1 comprising avoiding exposure of said catalyst to a sulfur-containing compound at a temperature below about 500° C.

19. The process of claim 1 wherein said contact time is no more than about 200 milliseconds.

20. The process of claim 1 carried out in a system comprising:

an assembly comprising, in sequential flow arrangement, a short contact time reactor, a boiler and a sulfur condenser, said reactor comprising a feed gas inlet, an oxygen gas inlet, and said catalyst that is selective for catalyzing the partial oxidation of hydrogen sulfide to form elemental sulfur and water, and said condenser having a first process gas outlet and a liquid sulfur outlet;

a primary hydrocarbon feed gas line in fluid communication with said reactor feed gas inlet;

a water/sulfur vapor removal unit in fluid communication with said first process gas outlet, and having a second process gas outlet and a liquid water outlet;

an amine absorption unit having an inlet in fluid communication with said second process gas outlet and with said primary hydrocarbon feed gas line, and having a regenerated hydrogen sulfide gas outlet and a purified hydrocarbon gas outlet; and a secondary hydrocarbon feed gas line in fluid communication with said primary hydrocarbon feed gas line and with said reactor feed gas inlet, and adapted for receiving hydrogen sulfide gas from said regenerated hydrogen sulfide gas outlet.

21. The process of claim 1 carried out in a system comprising:

an assembly comprising, in sequential flow arrangement, a short contact time reactor, a boiler and a sulfur condenser, said reactor comprising a feed gas inlet, an oxygen gas inlet, and said catalyst that is selective for catalyzing the partial oxidation of hydrogen sulfide to form elemental sulfur and water, and said condenser having a first process gas outlet and a liquid sulfur outlet;

a primary hydrocarbon feed gas line in fluid communication with said reactor feed gas inlet;

a water/sulfur vapor removal unit in fluid communication with said first process gas outlet, and having a second process gas outlet and a liquid water outlet;

an amine absorption unit having an inlet in fluid communication with said second process gas outlet and having a regenerated hydrogen sulfide gas outlet and a purified hydrocarbon gas outlet;

a return hydrogen sulfide line in fluid communication with said regenerated hydrogen sulfide gas outlet and said primary hydrocarbon feed gas line; and a return hydrocarbon product line in fluid communication with said return hydrogen sulfide line and said purified hydrocarbon gas outlet.

22. The process of claim 1 wherein said process generates a $CO_2$ yield of about 10% or less.

23. The process of claim 1 wherein said process generates a CO yield of about 1.4% or less.

24. A process of sweetening a light hydrocarbon feed gas stream containing at least one $C_1$-$C_5$ hydrocarbon component and an $H_2S$ component, the process comprising:

at a temperature above about 500° C., at a molar ratio of $H_2S$ to $O_2$ in the range of about 2:1 to about 5:1, and in the presence of a $H_2S$-selective catalyst comprising Pt, Rh, Ir, Sn and Mg, partially oxidizing the $H_2S$ component in said light hydrocarbon feed gas stream to form elemental sulfur and water, while convening the light hydrocarbon in said feed gas stream to CO or $CO_2$ with a CO yield of about 1.4% or less and a $CO_2$ yield of about 10% or less;

recovering unconverted light hydrocarbon; and recovering liquid sulfur.

25. The process of claim 24 wherein said catalyst comprising Pt, Rh, Ir, Sn and Mg is supported on a refractory support.

26. The process of claim 25 wherein said refractory support is selected from the group consisting of alumina, zirconia, and magnesium oxide.

27. The process of claim 25 wherein said catalyst comprises 0.25-5 wt. % Pt, 0.25-5 wt. % Rh, 0.25-5 wt. % Ir, 0.25-5 wt. % Sn and 1-5 wt. % Mg (by weight of the supported catalyst) supported on a refractory support.

28. A process of sweetening a light hydrocarbon feed gas stream containing at least one $C_1$-$C_5$ hydrocarbon component and an $H_2S$ component, said light hydrocarbon feed gas stream containing from 25 vol. % to 50 vol. % $H_2S$, the process comprising:

at a temperature above about 500° C., at a molar ratio of $H_2S$ to $O_2$ in the range of about 2:1 to about 5:1, and in the presence of a $H_2S$-selective catalyst comprising Pt, Rh, Ir, Sn, and Mg on a refractory support, partially oxidizing the $H_2S$ component in said light hydrocarbon feed gas stream to form elemental sulfur and water, while converting said light hydrocarbon component to CO or $CO_2$ with a hydrocarbon conversion of 32 mole % or less, a CO yield of about 4.6% or less, and a $CO_2$ yield of about 28% or less;

recovering unreacted light hydrocarbon; and recovering liquid sulfur.

29. The process of claim 28 wherein said catalyst comprises 0.25-5 wt. % Pt, 0.25-5 wt. % Rh, 0.25-5 wt. % Ir, 0.25-5 wt. % Sn and 1-5 wt. % Mg (by weight of the supported catalyst) supported on a refractory support.

30. A process of sweetening a light hydrocarbon feed gas stream containing methane and an $H_2S$ component, the process comprising:

at a temperature above about 500° C., at a molar ratio of $H_2S$ to $O_2$ in the range of about 2:1 to about 5:1, and in the presence of a $H_2S$-selective catalyst comprising Pt, Rh, Ir, Sn, and Mg on a refractory support, partially oxidizing the $H_2S$ component in said light hydrocarbon feed gas stream to form elemental sulfur and water, said process achieving a methane conversion to CO or $CO_2$ of 0.13% or less during said $H_2S$ partial oxidation.

* * * * *

UNITED STATES PATENT AND TRADEMARK OFFICE
CERTIFICATE OF CORRECTION

PATENT NO. : 7,326,397 B2
APPLICATION NO. : 11/225355
DATED : February 5, 2008
INVENTOR(S) : Sriram Ramani et al It is certified that error appears in the above-identified patent and that said Letters Patent is hereby corrected as shown below:

Column 26,
Line 30, "$H_2O\ S + 1/2\ O_2 \rightarrow S_{X+}H_2$" should read -- $H_2S + 1/2\ O_2 \rightarrow S_x + H_2O$ --.

Column 27,
Line 41, "$Oo_2$" should read -- $O_2$ --.

Column 27,
Line 54, the word "air," was omitted before the words "and $O_2$".

Column 29,
Line 9, "convening" should read --converted--.

Signed and Sealed this

Thirteenth Day of May, 2008

JON W. DUDAS
*Director of the United States Patent and Trademark Office*